(12) United States Patent
Mukhopadhyay

(10) Patent No.: US 11,839,917 B2
(45) Date of Patent: Dec. 12, 2023

(54) POLYSCRYSTALLINE DIAMOND COMPACT INCLUDING EROSION AND CORROSION RESISTANT SUBSTRATE

(71) Applicant: US SYNTHETIC CORPORATION, Orem, UT (US)

(72) Inventor: Debkumar Mukhopadhyay, Sandy, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 572 days.

(21) Appl. No.: 16/644,434

(22) PCT Filed: Sep. 11, 2019

(86) PCT No.: PCT/US2019/050620
§ 371 (c)(1),
(2) Date: Mar. 4, 2020

(87) PCT Pub. No.: WO2020/056007
PCT Pub. Date: Mar. 19, 2020

(65) Prior Publication Data
US 2021/0229177 A1 Jul. 29, 2021

Related U.S. Application Data

(60) Provisional application No. 62/730,137, filed on Sep. 12, 2018.

(51) Int. Cl.
*B22F 7/06* (2006.01)
*B22F 3/14* (2006.01)
(Continued)

(52) U.S. Cl.
CPC .................. *B22F 7/06* (2013.01); *B22F 3/14* (2013.01); *C22C 29/02* (2013.01); *E21B 10/567* (2013.01);
(Continued)

(58) Field of Classification Search
CPC .......... B22F 7/06; B22F 3/14; B22F 2302/10; B22F 2302/406; B22F 2304/10;
(Continued)

(56) References Cited

U.S. PATENT DOCUMENTS 7,866,418 B2   1/2011   Bertagnolli et al.
9,346,149 B1   5/2016   Linford et al.
(Continued)

FOREIGN PATENT DOCUMENTS

CA   3063097 A1   11/2018
EP   3198045 A1   8/2017
WO   2016/049452 A1   3/2016

OTHER PUBLICATIONS

Extended European Search Report dated Jun. 22, 2022 received in European Patent App. 19861208.7.
(Continued)

*Primary Examiner* — Brian D Walck
*Assistant Examiner* — Danielle M. Carda
(74) *Attorney, Agent, or Firm* — Dorsey & Whitney LLP

(57) ABSTRACT

Embodiments disclosed herein relate to polycrystalline diamond compacts that have a substrate including a cementing constituent constituting less than 13 weight percent (wt %) of the substrate, the cementing constituent including a cobalt alloy having and at least one alloying element, wherein the at least one alloying element constitutes less than 12 wt % of the substrate and wherein the cobalt constitutes less than 12 wt % of the substrate; and methods of making the same.

25 Claims, 13 Drawing Sheets

(51) Int. Cl.
*C22C 29/02* (2006.01)
*E21B 10/567* (2006.01)

(52) U.S. Cl.
CPC ..... *B22F 2302/10* (2013.01); *B22F 2302/406* (2013.01); *B22F 2304/10* (2013.01)

(58) Field of Classification Search
CPC . B22F 7/08; C22C 29/02; C22C 26/00; C22C 29/08; C22C 29/06; E21B 10/567; C09K 3/14; C01B 32/28
USPC .......................................................... 175/374
See application file for complete search history.

(56) References Cited

U.S. PATENT DOCUMENTS

| | | |
|---|---|---|
| 9,732,563 B1 | 8/2017 | Mukhopadhyay |
| 2005/0247491 A1 | 11/2005 | Mirchandani et al. |
| 2008/0029310 A1* | 2/2008 | Stevens ................... C22C 29/00 175/375 |
| 2010/0000158 A1 | 1/2010 | De Leeuw-Morrison et al. |
| 2011/0067929 A1* | 3/2011 | Mukhopadhyay ........ C23F 1/28 51/307 |
| 2014/0262533 A1* | 9/2014 | Scott ................... E21B 10/5735 175/263 |
| 2014/0311810 A1 | 10/2014 | Konyashin et al. |
| 2017/0297960 A1 | 10/2017 | Zhang et al. |

OTHER PUBLICATIONS

International Search Report and Written Opinion from International Application No. PCT/US2019/050620 dated Dec. 4, 2019.
U.S. Appl. No. 62/560,185, filed Sep. 18, 2017.
U.S. Appl. No. 62/730,137, filed Sep. 12, 2018.
"The new way—corrosion resistant carbide", http://www.rivessrl.com/public/catalogo/metallo_duro_ceratizit.pdf, last accessed Sep. 12, 2018, 1 page.
Mori, et al., "Influencing the Corrosion Resistance of Cemented Carbides by addition of Cr2C3, TiC and TaC", 1th International Plansee Seminar, Eds. G. Kneringer, P. Rodhammer and H. Wildner, Plansee Holding AG, Reutte, vol. 2, 2001, pp. 222-236.

\* cited by examiner

POLYCRYSTALLINE DIAMOND COMPACT INCLUDING EROSION AND CORROSION RESISTANT SUBSTRATE

CROSS-REFERENCE TO RELATED APPLICATIONS

This application is a U.S. Nationalization of PCT International Application No. PCT/US2019/050620 filed on 11 Sep. 2019, which claims priority to U.S. Provisional Application No. 62/730,137 filed on 12 Sep. 2018, the disclosure of each of the foregoing applications is incorporated herein, in its entirety, by this reference.

BACKGROUND

Wear-resistant, polycrystalline diamond compacts ("PDCs") are utilized in a variety of mechanical applications. For example, PDCs are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller-cone drill bits and fixed-cutter drill bits. A PDC cutting element typically includes a superabrasive diamond layer commonly known as a diamond table. The diamond table is formed and bonded to a substrate (e.g., a cemented carbide) using a high-pressure/high-temperature ("HPHT") process. The PDC cutting element may be brazed directly into a preformed pocket, socket, or other receptacle formed in a bit body. The substrate may often be brazed or otherwise joined to an attachment member, such as a cylindrical backing. A rotary drill bit typically includes a number of PDC cutting elements connected to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a substrate into a container with a volume of diamond particles positioned on a surface of the substrate. A number of such containers may be loaded into an HPHT press. The substrate(s) and volume(s) of diamond particles are then processed under HPHT conditions in the presence of a catalyst material that causes the diamond particles to bond to one another to form a matrix of bonded diamond grains defining a polycrystalline diamond ("PCD") table.

Despite the availability of a number of different PDCs, manufacturers and users of PDCs continue to seek improved PDCs.

SUMMARY

Embodiments disclosed herein relate to erosion and corrosion resistant substrates in polycrystalline diamond compacts. In an embodiment, a polycrystalline diamond compact is disclosed. The polycrystalline diamond compact includes a substrate including a first plurality of carbide grains and a cementing constituent constituting less than 13 weight percent (wt %) of the substrate. The cementing constituent includes a cobalt alloy having cobalt and at least one alloying element wherein the at least one alloying element constitutes less than 12 wt % of the substrate and wherein the cobalt constitutes less than 12 wt % of the substrate. The polycrystalline diamond compact includes a polycrystalline diamond table bonded to the substrate, and wherein the substrate includes one or more of a density of about 14.0 g/cc to about 15.0 g/cc, a hardness of about 88.0 HRa to about 89.0 HRa, a fracture toughness of about 12.0 MPa•m$^{1/2}$ to about 14.0 MPa•m$^{1/2}$, a transverse rupture strength of about 400 ksi to about 550 ksi, or a corrosion rate of about 0.1 mil/year to about 4.0 mil/year.

In an embodiment, a method of forming a polycrystalline diamond compact is disclosed. The method includes providing a substrate. The substrate includes a first plurality of carbide grains and a cementing constituent constituting less than 13 wt % of the substrate. The cementing constituent includes a cobalt alloy having cobalt and at least one alloying element wherein the at least one alloying element constitutes less than 12 wt % of the substrate and wherein the cobalt constitutes less than 12 wt % of the substrate. The method includes disposing a volume of diamond particles adjacent to the substrate to form an assembly. The method includes subjecting the assembly to an HPHT process to sinter the diamond particles to form a polycrystalline diamond table and to bond the substrate to the polycrystalline diamond table, and wherein the substrate includes one or more of a density of about 14.0 g/cc to about 15.0 g/cc, a hardness of about 88.0 HRa to about 89.0 HRa, a fracture toughness of about 12.0 MPa•m$^{1/2}$ to about 14.0 MPa•m$^{1/2}$, a transverse rupture strength of about 400 ksi to about 550 ksi, or a corrosion rate of about 0.1 mil/year to about 4.0 mil/year.

In an embodiment, a rotary drill bit is disclosed. The rotary drill bit includes a bit body configured to engage a subterranean formation. The rotary drill bit includes a plurality of polycrystalline diamond cutting elements affixed to the bit body. At least one of the polycrystalline diamond cutting elements includes a substrate including a first plurality of carbide grains and a cementing constituent that is less than 13 wt % of the substrate. The cementing constituent includes a cobalt alloy having cobalt and at least one alloying element wherein the at least one alloying element constitutes less than 12 wt % of the substrate and wherein the cobalt constitutes less than 12 wt % of the substrate. The at least one of the polycrystalline diamond cutting elements includes a polycrystalline diamond body bonded to the substrate, and wherein the substrate includes one or more of a density of about 14.0 g/cc to about 15.0 g/cc, a hardness of about 88.0 HRa to about 89.0 HRa, a fracture toughness of about 12.0 MPa•m$^{1/2}$ to about 14.0 MPa•m$^{1/2}$, a transverse rupture strength of about 400 ksi to about 550 ksi, or a corrosion rate of about 0.1 mil/year to about 4.0 mil/year.

In an embodiment, a carbide substrate is disclosed. The carbide substrate includes a first plurality of carbide grains. The carbide substrate includes a cementing constituent that is less than 13 wt % of the substrate. The cementing constituent includes a cobalt alloy having cobalt and at least one alloying element wherein the at least one alloying element constitutes less than 12 wt % of the substrate, wherein the cobalt constitutes less than 12 wt % of the substrate, and wherein the substrate includes one or more of a density of about 14.0 g/cc to about 15.0 g/cc, a hardness of about 88.0 HRa to about 89.0 HRa, a fracture toughness of about 12.0 MPa•m$^{1/2}$ to about 14.0 MPa•m$^{1/2}$, a transverse rupture strength of about 400 ksi to about 550 ksi, or a corrosion rate of about 0.1 mil/year to about 4.0 mil/year.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Embodiments disclosed herein relate to erosion and corrosion resistant substrates for polycrystalline diamond compacts (PDCs), methods of making polycrystalline diamond compacts with the substrates, and drill bits utilizing polycrystalline diamond compacts having the erosion and corrosion resistant substrates. The erosion and corrosion resistant substrates include a first plurality of carbide grains and a cementing constituent that is less than 13 weight percent (wt %) of the substrate. The cementing constituent includes an alloy including cobalt and at least one alloying element such as one or more of at least one substitutional alloying element or at least one interstitial alloying element. The at least one alloying element may be less than 12 wt % of the substrate. The carbide particles of the erosion and corrosion resistant substrates exhibit an average grain size of less than about 1.3 µm. One or more additional carbides may be included in the substrate to inhibit carbide grain growth in a region surrounding an interface of the substrate and the PCD body as well as to increase the corrosion resistance of the substrate. Additional elements, such as ruthenium or rhenium, may be added to the substrate to increase corrosion resistance.

Tests demonstrated that the substrates disclosed herein provide increased erosion (e.g., wear) resistance over similarly constructed substrates that do not have the cobalt alloys and amounts of the cementing constituents disclosed herein. Further, tests also demonstrated that the PDCs having the corrosion and erosion resistant substrates disclosed herein have substantially the same impact resistance of similarly constructed PDCs with substrates that do not have the cobalt alloys and amounts of the cementing constituents disclosed herein. Accordingly, the PDCs having the erosion and corrosion resistant substrates disclosed herein may provide relatively high wear resistance without sacrificing impact resistance.

Figure 1A:
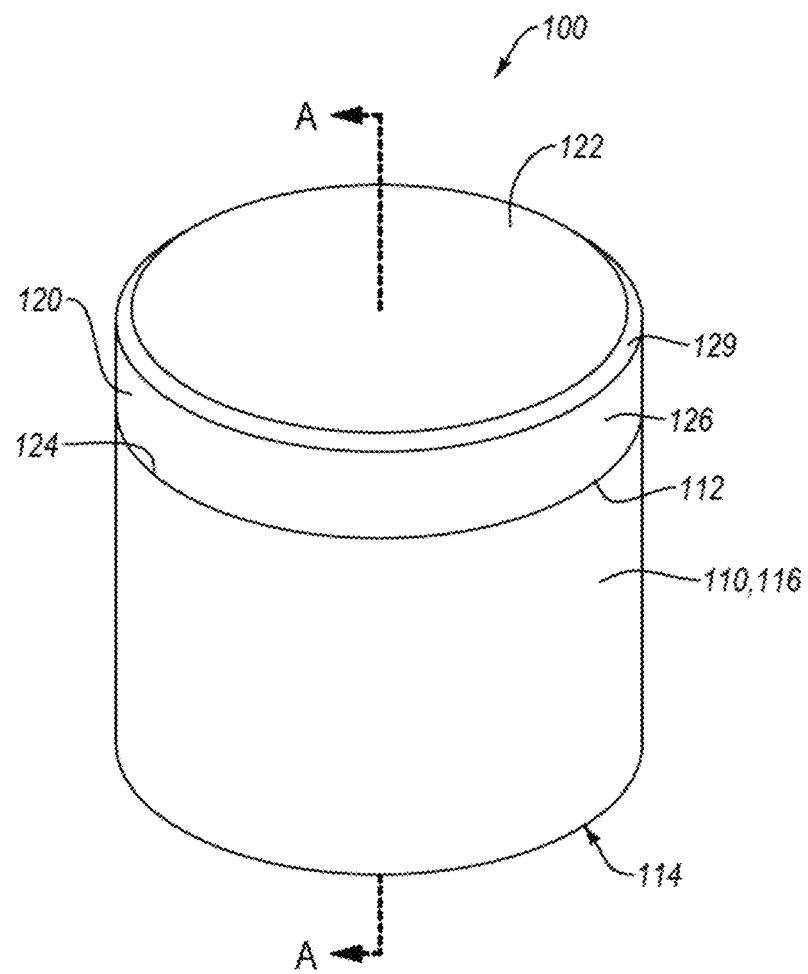
FIG. 1A is an isometric view of a PDC, according to an embodiment.
Figure 1B:
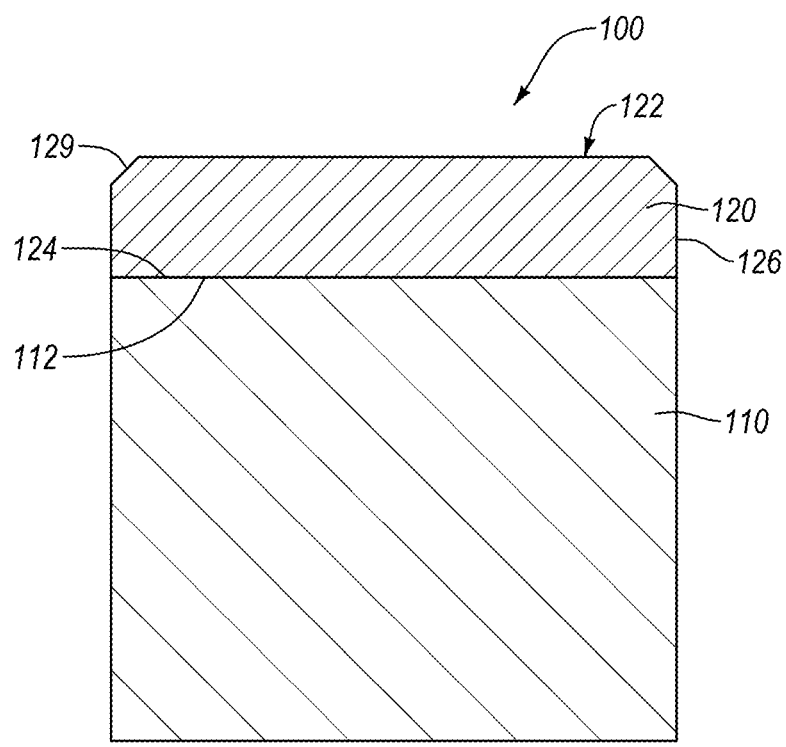
FIG. 1B is a cross-sectional view of the PDC of FIG. 1A taken along the plane A-A, according to an embodiment.

FIGS. 1A and 1B are isometric and cross-sectional views of a PDC 100, according to an embodiment. The PDC 100 includes a substrate 110 and a PCD table 120 bonded to the substrate 110. The PCD table 120 includes an upper surface 122, an interfacial surface 124 spaced from the upper surface, and a lateral surface 126 extending between the upper surface 122 and the interfacial surface 124. In an embodiment, the PCD table 120 may include a chamfer 129 extending between the upper surface 122 and the lateral surface 126. The substrate 110 includes a bonding surface 112, a base surface 114 spaced from the bonding surface 112, and a side surface 116 extending between the bonding surface 112 and the base surface 114. The interfacial surface 124 may be disposed on the bonding surface 112. The interfacial surface 124 of the PCD may be bonded to the bonding surface 112 via a metallurgical bond, such as via infiltration of the cementing constituent into the PCD table 120 from the substrate 110.

The substrate 110 includes a plurality of carbide grains bonded together with a cementing constituent. The plurality of carbide grains can include one or more types of carbides. For example, the plurality of carbide grains may include a first plurality of carbide grains. The first plurality of carbide grains may constitute the major component of the substrate 110. For example, the first plurality of carbide grains may comprise more than 50% of the substrate 110 by volume, weight, or both. The first plurality of carbide grains may be a carbide of a refractory metal. For example, the first plurality of carbide grains may include chromium carbide, molybdenum carbide, niobium carbide, tantalum carbide, titanium carbide, tungsten carbide, vanadium carbide, etc.

The first plurality of carbide grains may be at least 50 wt % of the substrate 110, such as 50 wt % to about 99 wt %, about 60 wt % to about 90 wt %, about 50 wt % to about 70 wt %, about 70 wt % to about 90 wt %, about 60 wt % to about 80 wt %, less than about 95 wt %, or less than about 90 wt % of the substrate 110. In some embodiments, the first plurality of carbide grains may make up at least 50% of the substrate 110 by volume (vol %), such as in any of the values of the wt % provided above. As used herein, the term "about" refers to an allowable variance of the term modified by "about" by ±10%. Further, the terms "less than," "or less," "more than," or "or more" include as an endpoint, the value that is modified by the term terms "less than," "or less," "more than," or "or more."

In some embodiments, the plurality of carbide grains may include at least a second plurality of carbide grains. Depending on the type of carbide, the at least a second plurality of carbide grains may provide corrosion resistance to the substrate 110 and inhibit grain growth of carbide grains (e.g., tungsten carbide) in the substrate 110 under sintering conditions. Further, the inventor currently believes that erosion (e.g., wear) resistance in the PCD table 120 is increased by the presence of the second plurality of carbide grains in the PCD table 120, which may be at least partially swept (e.g., in solution or physically) into the PCD table 120 with the cementing constituent (e.g., cobalt alloy) during HPHT sintering or bonding. The at least a second plurality of carbide grains may include refractory metal carbide grains that are different than the first plurality of carbide grains in one or more aspects such as composition or grain size. For example, the at least a second plurality of carbide grains may include chromium carbide, molybdenum carbide, niobium carbide, tantalum carbide, titanium carbide, tungsten carbide, vanadium carbide, etc., that is different from the refractory metal carbide of first plurality of carbide grains. The at least a second plurality of carbide grains may include a second, third, fourth, etc. plurality of carbide grains. For example, plurality of carbide grains may include a (first) plurality of tungsten carbide grains, a (second) plurality of molybdenum carbide grains, and a (third) plurality of vanadium carbide grains. The tungsten carbide may be at least 50 wt % of the substrate 110, the molybdenum carbide may be about 1 wt % of the substrate 110, and the vanadium carbide may be at least about 0.15 wt % of the substrate 110.

In some embodiments, the at least a second plurality of carbide grains may be at least about 0.1 wt % of the substrate 110, such as about 0.1 wt % to about 20 wt %, about 0.1 wt % to about 5 wt %, about 0.15 wt % to about 3 wt %, about 0.1 wt % to about 0.25 wt %, about 0.15 wt % to about 0.25 wt %, 0.25 wt % to about 1 wt %, about 0.5 wt % to about 2 wt %, about 1 wt % to about 3 wt %, less than about 5 wt %, or less than about 3 wt %. For example, the substrate 110 containing the at least a second plurality of carbide grains may include one or more of less than 1 wt % chromium carbide, less than 1 wt % molybdenum carbide, less than 1 wt % niobium carbide (e.g., 0.25 wt %), less than 1 wt % tantalum carbide, less than 1 wt % titanium carbide, or less than 0.5 wt % vanadium carbide (e.g., 0.15 wt %). In some embodiments, the preceding amounts of the at least a second plurality of carbide grains may include more than one additional plurality of carbide grains (in addition to the first plurality of carbide grains). In such embodiments, the listed amounts may be cumulative of all additional pluralities of carbide grains or may be an individual value for each respective plurality of carbide grains.

In some embodiments, the average grain size of the plurality of carbide grains is less than 1.5 µm, such as about 0.5 µm to about 1.5 µm, about 0.5 µm to about 1.0 µm, about 0.8 µm to about 1.3 µm, about 1.0 µm to about 1.5 µm, about 1.0 µm to about 1.2 µm, less than 1.3 µm, less than 1.2 µm, or less than 1 µm. As noted in more detail below, carbide grains with an average grain size of about 1.2 µm have demonstrated improved erosion and/or corrosion resistance. In some embodiments, each of the pluralities of carbide grains may have any of the average grain sizes disclosed herein. In some embodiments, the first plurality of carbide grains may have a first grain particle size and the at least a second plurality of carbide grains may have at least a second grain particle size, such as any of the average grain sizes disclosed herein. In some embodiments, the plurality of carbide grains may have an average grain size that is larger than 1.5 µm, such as 1.5 µm to about 5 µm. For example, the plurality of carbide grains (e.g., first plurality of carbide grains, at least a second plurality of carbide grains, or both) may have an average grain size of about 3.0 µm, such as about 2.5 µm to about 3.5 µm, about 2.5 µm to about 3.0 µm, about 3.0 µm to about 3.5 µm, less than about 3.5 µm, or less than about 3.0 µm. In some embodiments, a first portion of the carbide grains may be 2.8 µm and at least a second portion may be 4 µm.

The substrate 110 includes a cementing constituent that bonds the carbide grains together. The cementing constituent may include cobalt or an alloy thereof. The cobalt alloy may be less than 13 wt % of the substrate 110, such as about 1 wt % to about 12 wt %, about 1 wt % to about 4 wt %, about 4 wt % to about 8 wt %, about 8 wt % to about 12 wt %, less than about 12 wt %, less than about 10 wt %, less than about 8 wt %, less than about 6 wt %, less than about 4 wt %, less than about 2 wt %, or more than about 2 wt % of the substrate 110. For example, the substrate 110 may include cobalt alloy (e.g., as a cementing constituent) that is less than 12 wt % of the substrate 110. The inventor has discovered that the cobalt alloy cementing constituents disclosed herein may increase corrosion resistance, crack resistance, liquid metal embrittlement resistance, and/or erosion resistance when present as about 12 wt % or less of the substrate 110.

In addition to cobalt, the cementing constituent may include at least one alloying element such as one or more of at least one substitutional alloying element and/or at least one interstitial alloying element. The at least one substitutional alloying element may include one or more of at least one Group IB element, at least one Group IIB element, at least one Group IIIB element, at least one Group IVB element, at least one Group VB element, at least one Group VIB element, at least one Group VIIB element, or at least one Group VIII element. For example, the at least one substitutional alloying element may include one or more of iron or nickel. The at least one interstitial alloying element may include at least one Group IIIA, IVA, VA, or VIA element.

The at least one alloying element (e.g., one or more of at least one substitutional alloying element and/or at least one interstitial alloying element) may be less than 12 weight percent (wt %) of the substrate 110, such as greater than 0 wt % to about 12 wt %, greater than 0 wt % to about 4 wt %, about 2 wt % to about 6 wt %, about 2 wt % to about 4 wt %, about 4 wt % to about 8 wt %, about 8 wt % to about 12 wt %, less than 6 wt %, less than 4 wt %, or more than 2 wt % of the substrate. In some embodiments, the at least one substitutional alloying element includes nickel in an amount that is less than 6 wt % of the substrate 110. For example, the at least one substitutional alloying element may include nickel in an amount that is less than 6 wt % of the substrate and the cobalt is present in an amount that is less than 6 wt % of the substrate 110. In some embodiments, the at least one substitutional alloying element may include nickel in an amount that is at least 2 wt % of the substrate 110. The inventor has found that substrates that include at least 2 wt % of nickel in the cobalt alloy render the resulting substrate resistant to corrosion, resistant to erosion, and eliminates cracking in the PCD table bonded to the substrate and cracking in the substrate due to liquid metal embrittlement. In some embodiments, the first plurality of carbide grains may include tungsten carbide grains with an average grain size of less than 1.3 µm or 1.2 µm and the cementing constituent includes a cobalt and nickel alloy that is less than 12 wt % of the substrate 110.

In some embodiments, the cobalt alloy may contain 15 wt % to 50 wt % nickel (as a weight percent of the cobalt alloy) with the remainder including cobalt. For example, the at least one cobalt alloy may include 25 wt % nickel and 75 wt % cobalt. Additional alloying elements (e.g., additives) may be present in the cobalt alloy, such as rhenium or ruthenium.

In some embodiments, the substrate 110 may further include at least one additive. For example, the cobalt alloy of the cementing constituent may include the at least one additive. In some embodiments, the at least one additive may be separate from the cementing constituent (e.g., not alloyed with the cementing constituent). The at least one additive may include one or more of rhenium or ruthenium. The at least one additive may be less than about 4 wt % of the substrate 110, such as 0.1 wt % to about 4 wt %, about 0.2 wt % to about 3 wt %, about 1 wt % to about 4 wt %, about 0.5 wt % to about 3 wt %, about less than 3 wt %, less than 2 wt %, less than 1 wt %, or more than 0.5 wt % of the substrate 110. For example, rhenium may be used as the at least one additive in an amount that is about 0.5 wt % of the substrate 110. Ruthenium may be used as the at least one additive in an amount that is about 3.0 wt % of the substrate 110. In some embodiments both rhenium and ruthenium may be used, where the rhenium is less than 0.5 wt % and the ruthenium is less than 3 wt % of the substrate 110. In such examples, the cementing constituent may be 12 wt % of the substrate (e.g., 8 wt % cobalt and 4 wt % nickel).

In some embodiments, the substrate 110 may include one or more of less than 0.5 wt % vanadium carbide, less than 1 wt % molybdenum carbide (e.g., $Mo_2C$), or less than 1 wt % of chromium carbide (e.g., $Cr_3C_2$); less than 1 wt % of niobium carbide (e.g., NbC); less than 1 wt % tantalum carbide; less than 1 wt % titanium carbide; less than 0.5 wt % of rhenium or less than 3 wt % than ruthenium; or combinations of any of the foregoing; each as a wt % of the substrate.

In some embodiments, the substrate 110 may include 12 wt % cobalt, 0.5 wt % chromium carbide, with the balance being tungsten carbide having an average grain size of less than 1.3 μm. In some embodiments, the substrate 110 may include 12 wt % cobalt, 1.0 wt % molybdenum carbide, with the balance being tungsten carbide having an average grain size of less than 1.3 μm. In some embodiments, the substrate 110 may include 12 wt % cobalt, 1.0 wt % molybdenum carbide, 0.15 wt % vanadium carbide, with the balance being tungsten carbide having an average grain size of less than 1.3 μm. In some embodiments, the substrate 110 may include (a cementing constituent cobalt alloy of) 6 wt % cobalt and 6 wt % nickel; 1.0 wt % molybdenum carbide; 0.15 wt % vanadium carbide; with the balance being tungsten carbide having an average grain size of less than 1.3 μm. In some embodiments, the substrate 110 may include (a cementing constituent cobalt alloy of) 6 wt % cobalt and 6 wt % nickel, 0.5 wt % of chromium carbide, with the balance being tungsten carbide having an average grain size of less than 1.3 μm.

The PCD table 120 includes a plurality of directly bonded-together diamond grains exhibiting diamond-to-diamond bonding therebetween (e.g., $sp^3$ bonding). The plurality of directly bonded-together diamond grains defines a plurality of interstitial regions within the PCD table 120. The PCD table 120 may be formed by sintering a volume of diamond particles under HPHT conditions. As explained in more detail below, the HPHT conditions may include a pressure of at least 4 GPa and a temperature of at least 1,000° C. (e.g., diamond stable conditions). During sintering, the separate diamond particles bond together to form bonded-together diamond grains. The resulting volume of bonded-together diamond grains defines the PCD table 120. The interstitial regions between the bonded-together diamond grains may have one or more infiltrants therein, such the cementing constituent from the substrate 110. The cementing constituent may include a metal-solvent catalyst, such as a Group VIII metal (e.g., cobalt) alloy.

During the HPHT process, the cementing constituent from the substrate 110 or another infiltrant catalyst source may sweep into the diamond particles. For example, during attachment to the substrate 110, such as during an HPHT sintering or bonding process, infiltrant from outside of the volume (e.g., mass) of diamond particles or the PCD table 120 (e.g., cementing constituent from substrate 110) may infiltrate into the plurality of interstitial regions to bond the substrate 110 to the PCD table 120 resulting in the PDC 100. The cementing constituent may include a metal-solvent catalyst. For example, a Group VIII metal or an alloy thereof, such as the cobalt alloy may act as the metal-solvent catalyst. The metal-solvent catalyst may catalyze diamond-to-diamond bonding between individual diamond particles, resulting in the bonded diamond grains with the interstitial regions therein. The cementing constituent may remain in the interstitial regions of the PCD table 120 after the HPHT process. Accordingly, the interstitial regions of the PCD table 120 of the PDC 100 may include the cementing constituent therein, such as the cobalt alloy. For example, the cobalt alloy may be disposed in substantially all or only a portion of the plurality of interstitial regions. The cementing constituent may be present in a continuous body extending from the substrate 110 into the interstitial region of the PCD table 120, thereby bonding the PCD table 120 to the substrate 110.

In some embodiments, one or more of at least some of the plurality of carbide grains or the at least one additive may sweep into (e.g., in solution or physically) the interstitial regions of the PCD table 120 from the substrate 110 as the cementing constituent infiltrates from the substrate 110 into the PCD table 120 during HPHT processing.

In some embodiments, the PCD table 120 may be integrally formed with (e.g., formed from diamond powder sintered on) the substrate 110. In other embodiments, the PCD table 120 may be a preformed PCD table that is subsequently bonded to the substrate 110 in an HPHT bonding process (e.g., second HPHT process). In such embodiments, the cementing constituent may infiltrate into the preformed PCD table as disclosed above with respect to the integrally formed PCD table 120.

In some embodiments, the infiltrant disposed in at least a portion of the interstitial regions may be infiltrated primarily from the cemented carbide substrate 110 rather than from a separate metal-solvent catalyst source, such as a cobalt disk or cobalt powder. For example, the cobalt alloy may be disposed in substantially all or only a portion of the interstitial regions of the substrate 110 between the carbide grains thereof. In some embodiments, the cobalt alloy in at least a portion of the interstitial regions of the PCD table 120 may be about 1 wt % or more of the PCD table 120, such as about 1 wt % to about 8 wt %, about 2 wt % to about 7 wt %, about 3% to about 6 wt %, about 1.5 wt % to about 6 wt %, about 1 wt % to about 3 wt %, about 1.5 wt % to about 2.5 wt %, or about 2 wt % to about 4 wt %. The relative proportions of the components in the infiltrant cobalt alloy may be identical to or approximately the same as that in cementing constituent cobalt alloy of the cemented carbide substrate 110.

The PCD table 120 includes the upper surface 122 (e.g., working surface), the interfacial surface 124, and the lateral surface 126 extending between the upper surface 122 and the interfacial surface 124. In some embodiments, the PCD table 120 may include the chamfer 129 extending between the upper surface 122 and the lateral surface 126. It is noted that all or part of the at least one lateral surface 126 and/or the chamfer 129 may also function as a working surface. In the illustrated embodiment, the PDC 100 has a cylindrical geometry, and the upper surface 122 exhibits a substantially planar geometry. However, in other embodiments, the PDC 100 may exhibit a non-cylindrical geometry and/or the upper surface 122 of the PCD table 120 may be nonplanar, such as convex or concave.

In the illustrated embodiment, the interfacial surface 124 exhibits a substantially planar geometry. However, in other embodiments, the interfacial surface 124 may be nonplanar, such as convex, concave, or patterned (e.g., plurality of indentations, protrusions, or waves). The bonding surface 112 of the substrate may have a geometry that corresponds to geometry of the interfacial surface 124.

Returning to the substrate 110, the cemented carbide substrate 110 may include at least about 80 wt % tungsten carbide grains (e.g., about 80 wt % to about 90 wt %), less than about 5 wt % of at least one additional carbide (e.g., about 0.15 wt % to about 3 wt %), less than about 12 wt % cementing constituent, less than about 4 wt % of at least one additive, or combinations of any of the foregoing. The cementing constituent may include the cobalt alloy including cobalt and at least one alloying element. In embodiments, the at least one alloying element may include at least one of a substitutional alloying element (e.g., a Group IB, IIB, IIIB, IVB, VB, VIB, VIIB, VIII element) or an interstitial alloying element (e.g., a Group IIIA, IVA, VA, VIA element). The substitutional alloying element may be about 6 wt % nickel or less. Of course, the cobalt-nickel alloy cementing constituent may include other elements in addition to or in place of cobalt and nickel, such as tungsten, carbon, other elements/constituents provided from the carbide grains of the cemented carbide substrate 110, or combinations of the foregoing. The presence of the nickel in the cemented carbide substrate 110 may enhance the corrosion resistance of the substrate 110, while the presence of the cobalt provides erosion resistance for the cemented carbide substrate 110. In some embodiments, when nickel is present in the cobalt alloy, the total amount of cementing constituent (e.g., cobalt) may be maintained between 9 wt % to 12 wt % of the substrate to avoid causing the carbide in the substrate to become brittle (e.g., which may reduce cracking and breakage).

In some embodiments, the at least one additive may include ruthenium that is less than 3 wt % of the substrate, rhenium that is less than 0.5 wt % of the substrate, or both. In such embodiments, the at least one additional carbide may include less than 0.5 wt % vanadium carbide, less than 1 wt % molybdenum carbide, or less than 1 wt % chromium carbide; less than 1 wt % chromium carbide; less than 1 wt % tantalum carbide; in addition to the rhenium or ruthenium. The at least one additional carbide reduces abnormal grain growth of carbide grains, at the carbide substrate and also at the diamond-carbide interface in the PDC. The average grain size of the first and at least one additional carbide grains may be 1.2 µm or less.

As shown in the working examples below, embodiments of the substrates disclosed herein provide increased erosion (e.g., wear) resistance in addition to an improvement in the compressive strength or first crack load of the PDC having the substrate in comparison to substrates and PDCs made using more cobalt 13% with similar carbide grain sizes or examples with larger carbide grain sizes (e.g., 3.0 µm) with 13 wt % cobalt.

Figure 1C:
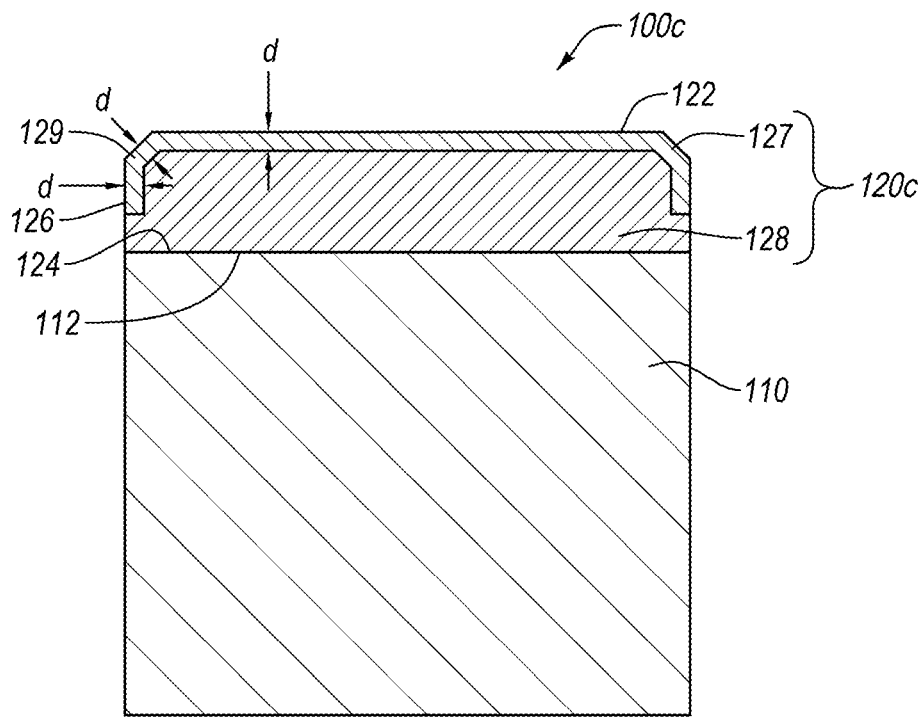
FIG. 1C is a cross-sectional view of the PDC of FIG. 1A taken along the plane A-A, according to an embodiment.

In some embodiments, at least some of the cementing constituent may be removed from the interstitial regions of the PCD table 120, such as via leaching. FIG. 1C is a cross-sectional view of the PDC of FIG. 1A taken on the plane A-A after leaching, according to an embodiment. The PDC 100c includes the PCD table 120c and the substrate 110. The PCD table 120c includes a first region 127 and a second region 128. The first region 127 extends inwardly from one or more of the upper surface 122, the side surface 126, or the chamfer 129, and the second region 128 extends inwardly from the interfacial surface 124. The first and second regions 127 and 128 may be formed by removing the cementing constituent and/or any other infiltrants (e.g., at least one additive or carbide grains) from at least a portion the PCD table 120 of FIG. 1B. For example, by leaching the PCD table 120 of FIG. 1B in a leaching acid, such as nitric acid, sulfuric acid, hydrochloric acid, aqua regia, or any other suitable leaching acid, the cementing constituent and/or other infiltrant(s) may be removed from the treated region of the PCD table 120 to form the (at least partially leached) PCD table 120c.

The first region 127 (e.g., leached region) may have at least some of the cementing constituent and at least one additive removed therefrom. The first region 127 may extend inwardly from one or more of the upper surface 122, the chamfer 129, or the lateral surface 126 to a leach depth "d" within the PCD table. The leach depth "d" may be at least about 10 µm, such as about 10 µm to about 1000 µm, such as about 10 µm to about 500 µm, about 20 µm to about 150 µm, about 30 µm to about 90 µm, about 20 µm to about 75 µm, about 50 µm to about 500 µm, 50 µm to about 200 µm, about 200 µm to about 300 µm, or about 250 µm to about 500 µm. The interstitial regions between the bonded diamond grains in the first region 127 may be substantially free of the cementing constituent, at least one additive, and one or more carbides. In some embodiments, the first region 127 may include a residual amount of an infiltrant such as the cementing constituent (e.g., substantially pure cobalt and/or a cobalt alloy). For example, the residual amount of an infiltrant such as the cobalt alloy cementing constituent may be less than about 1.5 wt % of the PCD table in the first region 127, such as about 0.1 wt % to about 1.50 wt %, about 0.1 wt % to about 0.50 wt %, about 0.5 wt % to about 1.0 wt %, about 1.0 wt % to about 1.5 wt %, or less than about 2 wt % of the first region 127 of PCD table 120c.

The first region 127 may be more thermally stable than the second region 128. For example, the cementing constituent present in the second region 128 may have a greater coefficient of thermal expansion ("CTE") than the diamond in the second region 128. The mismatch in CTE may cause cracking and spalling in the PCD table when the PCD table is heated (e.g., during cutting) due to the cementing constituent expanding more than the diamond in the PCD table. Accordingly, by removing an infiltrant from the first region 127, the PCD table 120c may be rendered relatively more thermally stable and may resist cracking, spalling, or other failures characteristic of the mismatch in CTE between diamond and a metal-solvent catalyst, such as cobalt.

The second region 128 extends inwardly from the interfacial surface 124. The second region 128 includes an infiltrant (e.g., cementing constituent, at least one additive, and/or carbide grains) that have swept into the PCD table 120c from the substrate 110 via the bonding surface 112 of the substrate 110.

As shown in FIG. 1C, in some embodiments, the first region 127 may be parallel to the upper surface 122, the lateral surface 126, and the chamfer 129. In such embodiments, the first region 127 may extend inwardly from the upper surface 122, the lateral surface 126, and the chamfer 129 to any of the leach depth "d" disclosed above. In some embodiments, the first region may be substantially planar, such as parallel to the upper surface 122.

One or more portions of the PCD tables disclosed herein may exhibit a selected coercivity and magnetic saturation, without having been leached. For example, where the HPHT pressure used to form the PCD table is a cell pressure of at least 7.5 GPa, the resulting (unleached) second region 128 of the PCD table 120c may exhibit a coercivity of about 115 Oersteads ("Oe") or more and a specific magnetic saturation of about 15 Gauss·cm³/grams ("G·cm³/g") or less. Such PCD tables and methods of making the same are described in U.S. Pat. No. 7,866,418, issued 11 Jan. 2011, which is incorporated herein, in its entirety, by this reference. Accordingly, the PDCs disclosed herein may include any of the substrates disclosed herein and a polycrystalline diamond table having an unleached portion which exhibits a coercivity of about 115 Oe or more and a specific magnetic saturation of about 15 G·cm³/g or less. Such magnetic properties are believed to be at least partially caused by increased nucleation and growth of diamond within the PCD table due to the relatively high HPHT pressure (e.g., a cell pressure of at least 7.5 GPa).

In some embodiments, the first region 127 may be re-infiltrated with a second infiltrant. The second infiltrant may be selected from silicon, silicon-cobalt alloys, a nonmetallic catalyst, and combinations of the foregoing. For example, the nonmetallic catalyst may be selected from a carbonate (e.g., one or more carbonates of Li, Na, K, Be, Mg, Ca, Sr, and Ba), a sulfate (e.g., one or more sulfates of Be, Mg, Ca, Sr, and Ba), a hydroxide (e.g., one or more hydroxides of Be, Mg, Ca, Sr, and Ba), elemental phosphorous and/or a derivative thereof, and combinations of the foregoing.

In some embodiments, the polycrystalline diamond compact includes the substrate and the polycrystalline diamond table bonded thereto. The substrate may include at least the first plurality of carbide grains (e.g., tungsten carbide) and the cementing constituent that is less than 13 wt % of the substrate. In an embodiment, the first plurality of carbide grains have an average grain size of about 1.3 μm, 1.2 μm, or less. In an embodiment, the cementing constituent may include the cobalt alloy having cobalt in an amount below 12 wt % of the substrate and the at least one alloying element (e.g., which may include one or more of at least one substitutional alloying element or at least one interstitial alloying element) also in an amount that less than 12 wt % of the substrate. In an embodiment, the at least one (substitutional) alloying element may include at least one Group IB element, at least one Group IIB element, at least one Group IIIB element, at least one Group IVB element, at least one Group VB element, at least one Group VIB element, at least one Group VIIB element, at least one Group VIII element, or combinations of any of the foregoing. In one embodiment, the at least one (interstitial) alloying element may include at least one Group IIIA element, at least one Group IVA element, at least one Group VA element, and/or at least one Group VIA element.

In some embodiments, the polycrystalline diamond compact includes the substrate and the polycrystalline diamond table bonded thereto. For example, the substrate may include at least the first plurality of carbide grains (e.g., tungsten carbide) and a cementing constituent that comprises less than 12 wt % of the substrate. In an embodiment, the first plurality of carbide grains may include tungsten carbide grains having an average grain size of about 1.3 μm, 1.2 μm, or less than 1.2 μm. In an embodiment, the cementing constituent may include a cobalt alloy having cobalt in an amount below 10 wt % (e.g., 6 wt % to 10 wt %) of the substrate and nickel in an amount that is at least 2 wt % (e.g., 2 wt % to 6 wt %) of the substrate.

In some embodiments, the polycrystalline diamond compact includes the substrate and the polycrystalline diamond table bonded thereto. For example, the first plurality of carbide grains may include tungsten carbide grains having an average grain size of about 1.3 μm, 1.2 μm, or less than 1.2 μm. Further, the substrate may include at least the first plurality of carbide grains and the cementing constituent that is less than 12 wt % of the substrate. In an embodiment, the cementing constituent may include the cobalt alloy having cobalt in an amount below 6 wt % of the substrate and nickel in an amount that is less than 6 wt % of the substrate.

In some embodiments, the polycrystalline diamond compact includes the substrate and the polycrystalline diamond table bonded thereto. For example, the first plurality of carbide grains have an average grain size of about 1.3 μm, 1.2 μm, or less than 1.2 μm. Further, the substrate may include at least the first plurality of carbide grains and the cementing constituent that is less than 12 wt % of the substrate. In an embodiment, the cementing constituent includes the cobalt alloy having cobalt in an amount below 8 wt % of the substrate and nickel in an amount that is less than 4 wt % of the substrate.

In some embodiments, the polycrystalline diamond compact includes the substrate and the polycrystalline diamond table bonded thereto. For example, the first plurality of carbide grains may have an average grain size of about 1.3 μm, 1.2 μm, or less than 1.2 μm. The substrate may include at least the tungsten carbide grains and the cementing constituent which is less than 12 wt % of the substrate. In one embodiment, the substrate includes a second plurality of carbide grains that is different than tungsten carbide, and the second plurality of carbide grains includes one or more of chromium carbide (e.g., greater than 0 wt % to 1 wt %), molybdenum carbide (e.g., greater than 0 wt % to 1 wt %), niobium carbide (e.g., greater than 0 wt % to 1 wt %), tantalum carbide (e.g., greater than 0 wt % to 1 wt %), titanium carbide (e.g., greater than 0 wt % to 1 wt %), or vanadium carbide (e.g., greater than 0 wt % to 0.5 wt %). In some embodiments, the cementing constituent may include the cobalt alloy having cobalt in an amount that is less than 12 wt % (e.g., 6 wt % to 10 wt %) of the substrate and nickel in an amount that is greater than 2 wt % of the substrate (e.g., 2 wt % to 6 wt %).

In some embodiments, the polycrystalline diamond compact includes the substrate and the polycrystalline diamond table bonded thereto. For example, the substrate may include at least the first plurality of carbide grains (e.g., tungsten carbide) and the cementing constituent that is less than 12 wt % of the substrate. Further, the cementing constituent may include the cobalt alloy having cobalt in an amount that is less than 10 wt % of the substrate and nickel that is at least 2 wt % of the substrate. Optionally, the substrate may include an additive including one or more of rhenium or ruthenium, such as where the rhenium is less than 0.5 wt % of the substrate and/or the ruthenium is less than 3 wt % of the substrate.

Aspects from any of the preceding embodiments may be combined to form a PDC. For example, one or more of carbide types, additives, grain sizes, cobalt alloy compositions, or other features may be combined from any of the embodiments disclosed herein.

In some embodiments, any of the substrates disclosed herein may be provided as a stand-alone body, without the PCD table. The properties of the substrates disclosed herein for use with any of the embodiments disclosed herein may vary. For example, the density of the substrates disclosed herein may be at least about 14.0 g/cc, such as about 14.0 g/cc to about 15.0 g/cc, about 14.0 g/cc to about 14.5 g/cc, about 14.5 g/cc to about 15.0 g/cc, about 14.0 g/cc to about 14.3 g/cc, about 14.2 g/cc to about 14.4 g/cc, about 14.3 g/cc to about 14.6 g/cc, about 14.6 g/cc to about 14.9 g/cc, more than about 14.2 g/cc, or less than about 15.0 g/cc. The hardness (in HRa) of the substrates disclosed herein may be at least about 88.0 HRa, such as about 88.0 HRa to about 89.0 HRa, about 88.0 to about 88.3 HRa, about 88.3 to about 88.6 HRa, about 88.6 to about 88.9 HRa, about 88.9 to about 89.5 HRa, about 88.0 to about 88.5 HRa, about 88.3 to about 88.9, about 88.5 to about 90.0 HRa, at least about 88.5 HRa, at least about 88.6 HRa, less than about 89.5 HRa, or less than about 90.5 HRa. The fracture toughness of the substrates may be at least than about 12.0 MPa•m$^{1/2}$, such as about 12.0 to about 14.0 MPa•m$^{1/2}$, about 12.0 to about 13.0 MPa•m$^{1/2}$, about 13.0 to about 14.0 MPa•m$^{1/2}$, about 13.0 to about 13.5 MPa•m$^{1/2}$, about 13.5 to about 14.0 MPa•m$^{1/2}$, at least than about 13.0 MPa•m$^{1/2}$, or less than about 14.0 MPa•m$^{1/2}$. The coercivity of the substrates disclosed herein may be at least about 130 Oe, such as about 130 to about 150 Oe, about 130 Oe to about 135 Oe, about 135 to about 140 Oe, about 140 to about 145 Oe, about 133 to about 135 Oe, about 135 to about 137 Oe, about 137 Oe to about 139 Oe, about 139 to about 141 Oe, about 141 to about 143 Oe, about 143 to about 145 Oe, or less than about 150 Oe. The transverse rupture strength of the substrates disclosed herein may be at least about 400 ksi, such as about 400 ksi to about 550 ksi, about 450 ksi to about 490 ksi, about 440 ksi to about 520 ksi, about 470 ksi to about 490 ksi, about 480 ksi to about 500 ksi, about 500 ksi to about 520 ksi, less than about 550 ksi, or less than about 520 ksi. The corrosion rate of the substrates disclosed herein may be about 4.0 mil/year or less, such as about 0.1 mil/year to about 4.0 mil/year, about 0.1 mil/year to about 0.5 mil/year, about 0.5 mil/year to about 1.0 mil/year, about 1.0 mil/year to about 1.5 mil/year, about 1.5 mil/year to about 2.0 mil/year, about 2.0 mil/year to about 2.5 mil/year, about 2.5 mil/year to about 3.0 mil/year, about 3.0 mil/year to about 3.5 mil/year, about 3.5 mil/year to about 4.0 mil/year, less than about 2.5 mil/year, less than about 1.5 mil/year, less than about 1 mil/year, or less than about 0.5 mil/year.

In specific examples, the substrate may include about 10.5 wt % cobalt about 2 wt % nickel with the remainder being tungsten carbide grains, where the substrate exhibits a density of about 14.2 to about 14.4 g/cc, a hardness of about 88.4 HRa to about 88.9 HRa, a fracture toughness of about 13.1 MPa•m$^{1/2}$ to about 13.3 MPa•m$^{1/2}$, a transverse rupture strength of about 440 ksi to about 520 ksi, a coercivity of about 130 Oe to 148 Oe, a corrosion resistance of about 0.1 mil/year to about 3.8 mil/year, or combinations of the any of the foregoing properties.

Figure 2:
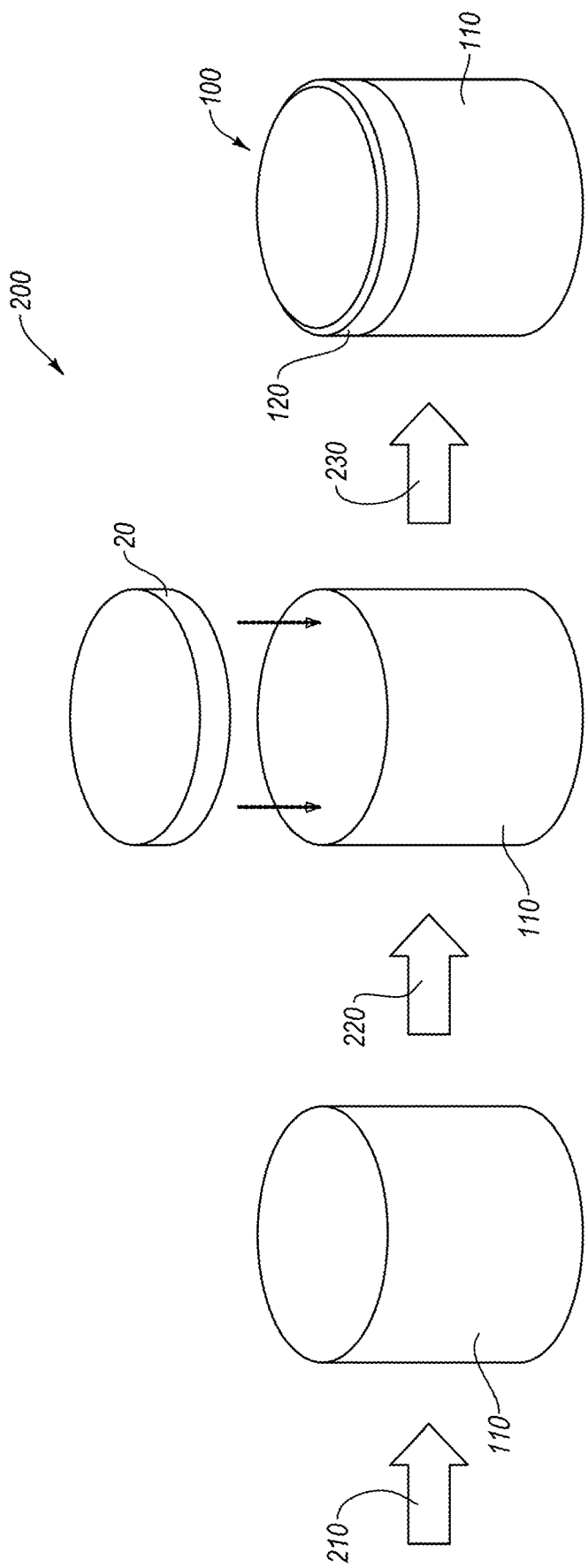
FIG. 2 is a schematic illustration of a method of making a PDC, according to an embodiment.

FIG. 2 is a schematic illustration of a method 200 of making a PDC 100, according to an embodiment. The method 200 includes an act 210 of providing a substrate 110. The method 200 includes an act 220 of disposing a volume of diamond particles adjacent to the substrate to form an assembly. The method 200 includes an act 230 of subjecting the assembly to an HPHT process to sinter the diamond particles to form a polycrystalline diamond table and to bond the substrate to the polycrystalline diamond table.

The act 210 of providing the substrate 110 may include providing any of the substrates disclosed herein. For example, the substrate 110 may include the first plurality of carbide grains, the cementing constituent, the at least a second plurality of carbide grains, and the at least one additive, as disclosed herein. More or fewer components may be present in the substrate 110 in some embodiments.

In some embodiments, providing the substrate 110 may include providing a substrate having a cementing constituent that is that is less than 13 weight percent wt % of the substrate, the cementing constituent including the cobalt alloy having cobalt in an amount below 12 wt % of the substrate and at least one alloying element (one or more of at least one substitutional alloying element or at least one interstitial alloying element) that is less than 12 wt % of the substrate 110. In some embodiments, providing the substrate 110 may include providing the substrate 110 having tungsten carbide grains with an average grain size of 1.2 μm or less, where the tungsten carbide grains are 80 wt % to 90 wt % of the substrate 110. In an embodiment, the cementing constituent may be 12 wt % or less of the substrate, where the cementing constituent includes the cobalt alloy having cobalt and the at least one alloying element as disclosed herein. For example, the at least one alloying element of the cobalt alloy may include nickel in an amount that is at least 2 wt % of the substrate 110.

In some embodiments, providing the substrate 110 may include providing the substrate 110 having tungsten carbide grains and the cementing constituent (e.g., cobalt alloy) that is an alloy of cobalt and nickel, where the nickel is 6 wt % of the substrate or less (e.g., 2 wt % to 6 wt %) and the cobalt is 6 wt % of the substrate or less (e.g., greater than 0 wt % to 6 wt %). For example, the at least one alloying element of the cobalt alloy may include nickel in an amount that is less than 6 wt % of the substrate and the cobalt of the cobalt alloy is present in an amount that is less than 6 wt % of the substrate. The at least one alloying element of the cobalt alloy may include nickel in an amount that is less than about 4 wt % of the substrate and the cobalt of the cobalt alloy is present in an amount that is less than about 8 wt % of the substrate.

In some embodiments, the substrate 110 may include at least a second plurality of carbide grains that is a different type of carbide than the first plurality of carbide grains. The at least a second plurality of carbide grains may include one or more of the following: less than 1 wt % chromium carbide, less than 1 wt % molybdenum carbide, less than 1 wt % niobium carbide, less than 1 wt % tantalum carbide, less than 1 wt % titanium carbide, and/or less than 0.5 wt % vanadium carbide. In some embodiments, the substrate 110 may further include at least one additive including one or more of rhenium or ruthenium, where the rhenium is less than 0.5 wt % of the substrate and/or the ruthenium is less than 3 wt % of the substrate. For example, providing a substrate 110 may include providing the substrate 110 having less than 0.5 wt % vanadium carbide, less than 1 wt % molybdenum carbide, and/or less than 1 wt % chromium carbide; less than 1 wt % chromium carbide; less than 1 wt % tantalum carbide; ruthenium that is less than 3 wt % of the substrate, rhenium that is less than 0.5 wt %, or both; or combinations of any of the foregoing.

In some embodiments, providing the substrate 110 may include placing the substrate 110 in a refractory metal container to form at least part of an assembly. The refractory metal container (e.g., can) may be placed in a pressure transmitting medium such as pyrophyllite.

The method 200 includes the act 220 of disposing a volume of diamond particles adjacent to the substrate to form an assembly. The volume of diamond particles 20 may include an unsintered volume of diamond particles (e.g., diamond powder), that is not bonded to the substrate 110. In such embodiments, the assembly may include the volume of diamond particles 20 disposed adjacent to or directly on the substrate 110. In some embodiments, the act 220 of disposing a volume of diamond particles adjacent to the substrate to form an assembly may include placing a plurality of unbonded diamond particles (e.g., diamond powder) adjacent to the substrate to form the assembly. For example, placing a plurality of unbonded diamond particles adjacent to the substrate to form the assembly may include placing the plurality of unbonded diamond particles into a refractory metal container with the substrate to form the assembly. The plurality of unbonded diamond particles may be placed on the bonding surface of the substrate.

In some embodiments, disposing a volume of diamond particles adjacent to the substrate to form an assembly may be replaced by placing a preformed PCD table (e.g., PCD body containing sintered diamond grains) adjacent to the substrate to form the assembly. The preformed PCD table may be an at least partially leached PCD table. The interfacial surface of the preformed PCD table may be placed on or adjacent to the bonding surface of the substrate. In some embodiments, placing a preformed PCD table adjacent to the substrate to form the assembly may be replaced by placing the preformed PCD table into a refractory metal container with the substrate to form the assembly. In such embodiments, the PCD table is bonded to the substrate.

The act 220 of disposing a volume of diamond particles adjacent to the substrate to form an assembly may include using a volume of (unbonded) diamond particles with an average diamond particle size of at least 1 μm, such as about 1 μm to about 80 μm, about 1 μm to about 10 μm, about 1 μm to about 20 μm, about 20 μm to about 40 μm, about 40 μm to about 80 μm, less than 80 μm, less than 40 μm, less than 20 μm, or less than 12 μm. In some examples, the volume or mass of diamond particles may have more than one average particle size, such as a first average particle size and a second average particle size in a bimodal distribution. The first average particle size may be any of the average particle sizes disclosed above and the second average particle size may be any of the average particle sizes disclosed above, where the second average particle size is different form the first average particle size. Further diamond particle size distributions may be used, such as uni-modal, tri-modal or other multi-modal distributions. Examples of suitable diamond particle size distributions are disclosed in U.S. Pat. No. 9,346,149, and U.S. Provisional Patent Application No. 62/560,185, the disclosures of which are incorporated herein, in their entirety, by this reference.

In some embodiments, the volume of diamond particles 20 may be replaced by using a preformed PCD table (e.g., an at least partially leached PCD table) that is not bonded to the substrate. In such embodiments, the assembly may include the preformed PCD table (e.g., pre-sintered PCD table) disposed adjacent to or directly on the substrate 110. The average diamond grain size of the sintered diamond grains in the preformed PCD table may be similar or identical to any of the diamond particle sizes or distributions thereof disclosed above for the unsintered diamond particles.

The assembly containing the volume of diamond particles and the substrate may be subjected to high-pressure and high-temperature process to bond the volume of diamond particles (e.g., diamond volume) to the substrate, and where the volume of diamond particles includes unbonded diamond particles, sintering to form the PCD table.

The method 200 includes the act 230 of subjecting the assembly to a high-pressure high-temperature process to sinter the diamond particles to form a polycrystalline diamond table and to bond the substrate to the polycrystalline diamond table. The act 230 of subjecting the assembly to an HPHT process to sinter the diamond particles to form a PCD table and to bond the substrate to the PCD table bonds the sintered mass of diamond grains (e.g., PCD table) to the substrate.

Subjecting the assembly to an HPHT process to sinter the diamond particles to form a PCD table and to bond the substrate to the PCD table may include placing the assembly into a pressure transmitting medium such as a pyrophyllite cube or other pressure transmitting medium. Subjecting the assembly to an HPHT process to sinter the diamond particles to form a PCD table and to bond the substrate to the PCD table may include placing the assembly (e.g., in the pyrophyllite cube) into a high-pressure press such as a cubic press or a belt press. The pressure transmitting medium, including the assembly, may be subjected to an HPHT process using the high-pressure press to create temperature and pressure conditions at which diamond is stable.

In some embodiments, where the volume of diamond particles is replaced with a preformed PCD table (e.g., pre-sintered diamond volume), subjecting the assembly to an HPHT process may only bond the substrate to the preformed PCD table. In such embodiments, the preformed PCD table may be disposed in a pressure transmitting medium and high-pressure press as disclosed above.

The temperature of the HPHT process may be at least about 1000° C. (e.g., about 1200° C. to about 1600° C.) and the pressure of the HPHT process may be at least 4.0 GPa (e.g., about 5.0 GPa to about 10.0 GPa) for a time sufficient to sinter the diamond particles to form the PCD table 120 (FIGS. 1A and 1B). For example, the pressure of the HPHT process may be about 5 GPa to about 9 GPa, at least about 8 GPa to about 14 GPa, or at least about 7.5 GPa and the temperature of the HPHT process may be about 1150° C. to about 1450° C., about 1250° C. to about 2000° C., or about 1200° C. to about 1400° C. It should be noted that the pressure values employed in the HPHT process disclosed herein refer to the pressure in the pressure transmitting medium (e.g., cell pressure) at room temperature (e.g., about 25° C.) with application of pressure using an ultra-high pressure press and not the pressure applied to exterior of the cell assembly (e.g., bulk pressure). The actual pressure in the pressure transmitting medium at sintering temperatures may be slightly higher than the pressure in the pressure transmitting medium at room temperature. In some embodiments, subjecting the assembly to an HPHT process to bond the substrate to the diamond volume (e.g., PCD table) includes subjecting the assembly to a pressure of at least 4 GPa and a temperature of at least 1,000° C. Upon cooling from the HPHT process, the PCD table 120 becomes metallurgically bonded to the cemented carbide substrate 110 via the infiltrant(s) that sweep into the PCD table 120 from the substrate 110. As noted herein, such infiltrants include the cementing constituent, the at least one additive, and carbide grains from the substrate 110. In some embodiments, the volume of diamond particles 20 such as a PCD table 120 (prior to or after bonding to the substrate 110) may be leached to enhance the thermal stability thereof, as previously described, if desired, the leached region may be infiltrated with any of the disclosed infiltrants.

During the HPHT process, a metal-solvent catalyst (e.g., cobalt, nickel, iron, etc.) may liquefy and infiltrate into the diamond volume such as unsintered diamond particles (e.g., powder) or sintered diamond grains of the PCD table 120. The metal-solvent catalyst may be provided from the substrate (e.g., the cementing constituent), a disk or powder of metal solvent catalyst material disposed on the substrate or diamond volume, or a particulate material mixed in a diamond particle mixture (e.g., diamond powder). For example, during the HPHT process, at least some of the cementing constituent (e.g., cobalt alloy) from the substrate may liquefy and infiltrate into the diamond particles (e.g., mass of unsintered diamond particles) or diamond grains (e.g., sintered PCD table) of the volume of diamond particles 20. The infiltrated cobalt-containing material functions as a catalyst that catalyzes formation of directly bonded-together diamond grains to sinter the volume of diamond particles 20 so that the PCD table 120 is formed and/or bonds the PCD table 120 to the substrate 110. While nickel may make the substrate and/or diamond table more brittle than when not present, the inventor believes that when the cobalt is alloyed with nickel and the cobalt is maintained between 8 wt % and 12 wt % of the substrate (e.g., nickel is between greater than 0 wt % to about 4 wt % of the substrate), the nickel contributes corrosion resistance to the PDC without sacrificing crack and/or erosion resistance. In some embodiments, the nickel may be at least about 2 wt % of the cementing constituent, such as about 2 wt % to 4 wt % (e.g., 2-3 wt %) of the substrate to limit cracking in the substrate due to liquid metal embrittlement (LME). The inventor has found that in order to at least reduce or eliminate LME cracking during braze heating (e.g., at temperatures less than about 725° C.) of cobalt-nickel cemented tungsten carbide substrates, the cementing constituent may include at least 2 wt % nickel (as a weight percent of the substrate) such as about 2 wt % to about 6 wt %. As demonstrated in the working examples below, the addition of at least 2 wt % nickel to the substrate, such as in a range of about 2 wt % to about 6 wt % nickel, is at least one way to improve LME resistance. As shown in working example 1 below, no LME crack was observed in substrate containing 12 wt % to 13 wt % cobalt alloy cementing constituent. As shown in working example 1 below, no LME crack was observed when the Co—Ni alloy cementing constituent contained 15 wt % nickel (as a weight percent of solely the cobalt alloy cementing constituent) or more.

In some embodiments, the method 200 may include leaching the PDC 100 to form an at least partially leached region therein. At least a portion of or substantially all of the infiltrant(s) may be removed from the sintered PCD table 120 by leaching. For example, the infiltrant(s) may be at least partially removed from the sintered PCD table by immersion in an acid, such as aqua regia, nitric acid, hydrofluoric acid, or other suitable acid, to form the at least partially leached PCD table (FIG. 1C). The sintered PCD table 120 may be immersed in the acid for about 2 to about 7 days (e.g., about 3, 5, or 7 days) or for a few weeks (e.g., about 4 weeks) depending on the amount of leaching that is desired. It is noted that a residual amount of the catalyst or infiltrant, such as the cobalt alloy metal-solvent catalyst, may still remain even after leaching for extended periods of time. The leached portion of the PCD table 120 may include a residual amount of the infiltrant (e.g., a cementing constituent from the substrate) in amount that is less than 2 wt % of the PCD table, such as about 0.2 wt % to about 1.50 wt %, 0.8 wt % to about 1.50 wt %, about 1 wt % to about 2 wt %, or about 0.90 wt % to about 1.2 wt %. In some embodiments, where nickel is present in the substrate cementing constituent, relatively longer leaching times may be required to effectively remove the infiltrated cementing constituent from the interstitial regions of the PCD table.

When the cementing constituent is infiltrated into the diamond particles from a cemented tungsten carbide substrate including tungsten carbide grains cemented with a metal-solvent catalyst (e.g., cobalt, nickel, iron, or alloys thereof), the infiltrated cementing constituent may carry one or more of tungsten from the substrate 110, tungsten carbide from the substrate 110, other carbides from the substrate 110, or other refractory metals from the substrate 110. The at least partially leached PCD table may include such tungsten and/or tungsten carbide therein disposed interstitially between the bonded diamond grains. The tungsten and/or tungsten carbide may be at least partially removed by the selected leaching process or may be relatively unaffected by the selected leaching process.

In some embodiments, the method 200 may include re-infiltrating the leached region (e.g., the first region 127 of FIG. 1C) with a further infiltrant, as disclosed above. Such re-infiltration may be carried out in a further HPHT process wherein the further infiltrant is melted and infiltrated into the substantially empty interstitial regions of the leached region, such as from a powder or disk if infiltrant positioned adjacent to the upper surface of the PCD table. The further infiltrant may be selected from silicon, silicon-cobalt alloys, a nonmetallic catalyst, and combinations of the foregoing as disclosed above.

A number of substrates and PDCs were formed as working and comparative examples to determine the effectiveness of the substrates disclosed herein. The following working examples provide further detail in connection with the specific substrate and PDCs embodiments described above.

EXAMPLES

Comparative Example A

Comparative example A included a PDC having a PCD table bonded to a substrate. A mixture of diamond powder having an average particle size of about 29 μm diamond particles was provided. The substrate was 13 wt % cobalt, with the remainder being tungsten carbide grains having an average particle size of 2-3 μm. The diamond particle mixture and the substrate were placed in a refractory metal container and subjected to an HPHT sintering process. Comparative example A was sintered at a cell pressure of about 8.0 GPa and a temperature of about 1,400° C.

Working Example 1

Working example 1 included a PDC having a PCD table bonded to a substrate. The PCD table was formed from a diamond powder mixture having an average diamond particle size of about 29 μm. The substrate was 12 wt % cementing constituent including 4 wt % nickel and 8 wt % cobalt, with the remainder of the substrate being tungsten carbide grains. The sintered tungsten carbide grains of the substrate included a bimodal mixture of 95 wt % 2.8 μm and 5 wt % 4 μm tungsten carbide particles. The diamond particle mixture and the substrate was placed in a refractory metal container and subjected to an HPHT sintering process. Working example 1 was sintered at a cell pressure of about 8.0 GPa and a temperature of about 1,400° C.

Working example 1 was braze tested. The sample PDCs of working example 1 were each brazed to a puck and heated until visual signs of liquid metal embrittlement were observed, according to the following procedure. A pocket in a testing puck was coated with flux. A braze material disk was placed in the pocket. The braze material disk included BRAZE™ 505 braze alloy (available from Lucas-Milhaupt of Cudahy, Wisconsin, U.S.A.) containing about 50 wt % silver, about 20 wt % cobalt, about 28 wt % zinc, and about 2 wt % nickel. The PDC was coated in flux and placed on its side in the pocket. The puck and PDC therein were placed in a heating coil. A camera was focused on the PDC. The heating coil heated up the puck for an 80 second duration, maintained the temperature between 710° C. and 725° C. for 900 seconds, and then cooled down while the camera recorded the time and results of the heating on the PDC. The visual signs of LME include a crack around the lateral surface of the substrate that may grow to a wide band around the substrate. The time (from the beginning of heating) of the onset of the LME crack, if any, prior to 900 seconds of maintaining the temperature at between 710° C. and 725° C., was determined to be the failure time.

Eight samples of working example 1 were tested. Working example 1 showed no LME cracking during the test.

PDC's containing comparative example A and working example 1 were tested for wear or abrasion resistance via diamond volume removal testing on a vertical turret lathe ("VTL"). The sample PDC's were tested on a VTL according to the procedure below.

The abrasion resistance was evaluated in the vertical turret lathe ("VTL") test by examining the volume of the PDC samples removed (i.e., diamond volume removed or "DVR") while the PDCs cut into a volume of a Barre granite workpiece while the workpiece is rotated and cooled with water. The test parameters included a depth of cut for the PDC of about 0.254 mm, a back rake angle for the PDC samples of about 20 degrees, an in-feed for the PDC samples of about 6.35 mm/rev, and a rotary speed of the Barre granite workpiece to be cut of about 101 RPM. The PDCs were moved across the workpiece in a series of passes. The volume of the sample PDCs was determined before and after running the VTL test. The difference in volume was determined to be the amount of DVR. The volume of granite removed was determined to be 470 cubic inches ($7.7 \times 10^6$ mm$^3$) per 50 passes, with each test run being 150 passes. Accordingly, the total volume of granite removed from the workpiece was 1,410 cubic inches ($2.31 \times 10^7$ mm$^3$) of rock.

Figure 3:
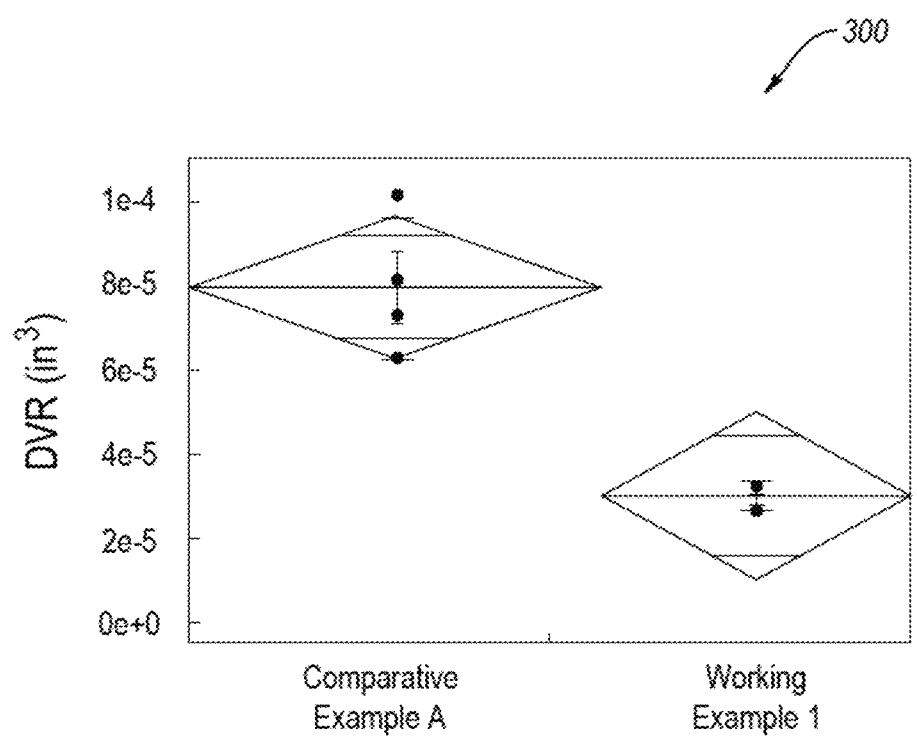
FIG. 3 is a graph of diamond volume removed ("DVR") for PDCs of comparative example A and working example 1 during a vertical turret lathe test.

FIG. 3 is a graph 300 of DVR for PDCs made with comparative example A and working example 1 during the vertical turret lathe test. The PDCs of working example 1 showed considerable wear resistance relative to PDCs of comparative example A. As shown in FIG. 3, comparative example A lost about $8.0 \times 10^{-5}$ inch$^3$ (1.31 mm$^3$) of diamond volume and working example 1 lost about $3.0 \times 10^{-5}$ inch$^3$ (0.49 mm$^3$) of diamond volume. Accordingly, working example 1, with the cobalt-nickel cementing constituent, may provide a PDC having a PCD table with greater wear resistance than comparative example A containing the pure cobalt cementing constituent.

Comparative Example B

Various example substrates were formed and tested for wear resistance. Comparative example B included a substrate comprising 13 wt % cobalt with the balance being tungsten carbide grains having an average particle size of about 1.2 μm.

Comparative Example C

Comparative example C substrates were formed. Comparative example C included a substrate comprising 13 wt % cobalt with the balance being tungsten carbide grains having an average particle size of about 2.0-3.0 μm.

Working Example 2

Working example 2 included a cobalt-cemented carbide substrate with an average tungsten carbide grain size of about 1.2 μm. The substrate also included about 0.25 wt % NbC or 0.15 wt % VC (as a grain growth inhibitor), about 12 wt % cobalt cementing constituent, with the balance being tungsten carbide grains.

The substrates of comparative example B, comparative example C, and working example 2 were tested for abrasion/erosion/wear resistance according to ASTM test method B611. Each of the samples (comparative example B, comparative example C, and working example 2) were weighed and the volume of each substrate was measured. A flat surface of the substrate samples were placed into a fixture in a vertical position tangent to a rotating steel wheel partially immersed in a slurry of water and aluminum oxide particles (30 grit). Each of the samples were pressed against a wheel with 200 Newtons of force as the wheel rotated for 1000 revolutions at 50 revolutions per minute (RPM). Each of the samples were pressed against the wheel for the 20 minutes. Each of the samples was then rinsed, weighed, and its volume was measured. The mass loss and volume loss was calculated for each sample by subtracting the post-test weight and/or volume from the pre-test weight and/or volume, respectively.

Figure 4:
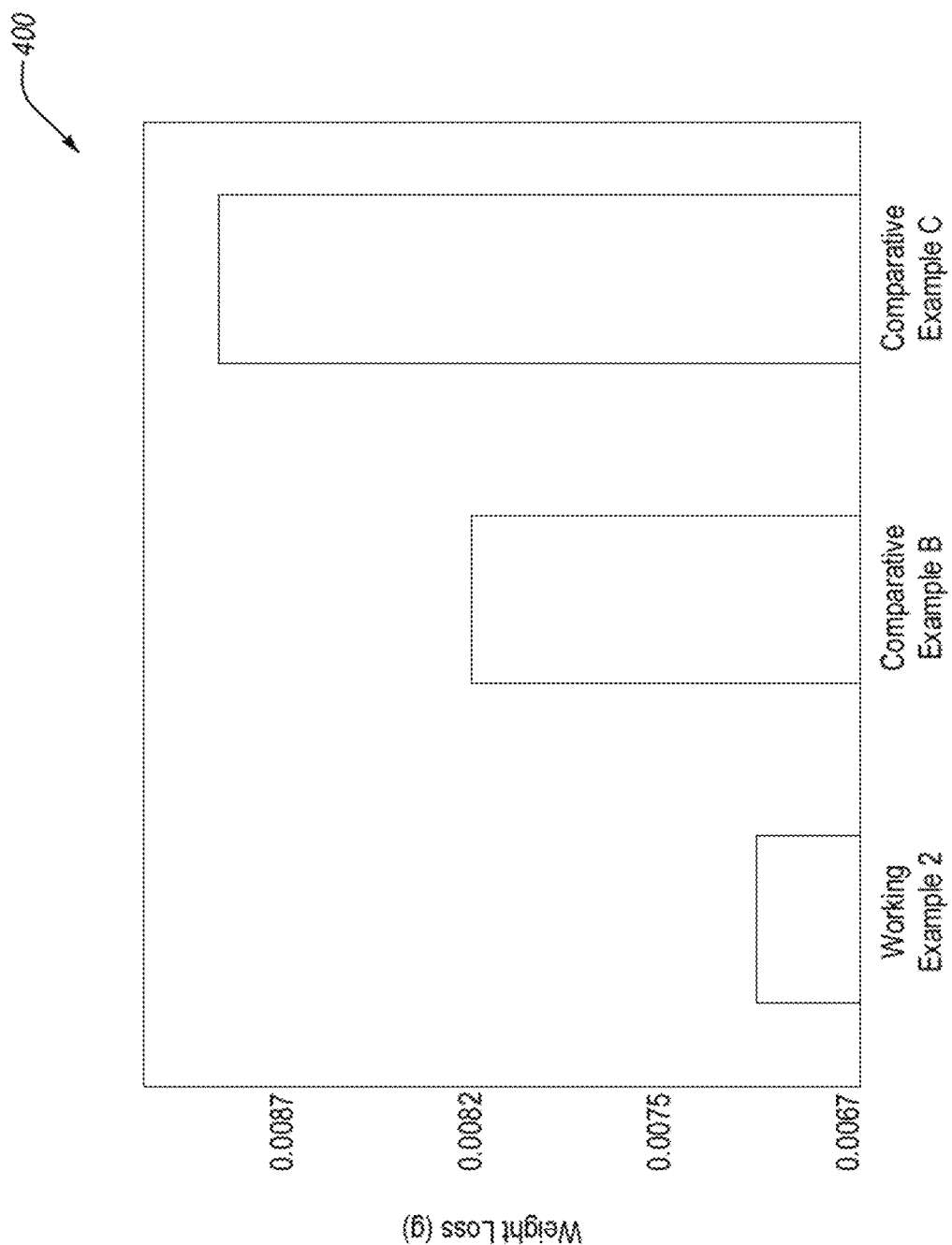
FIG. 4 is a graph of weight loss of wear tested substrates.

FIG. 4 is a graph 400 showing weight loss of the wear tested substrates. Working example 2 showed greater wear resistance relative to comparative examples B and C. As shown in FIG. 4, comparative example C lost 0.0089 g, comparative example B lost about 0.0082 g, and working example 2 lost 0.007 g of total weight during the testing procedure.

Figure 5:
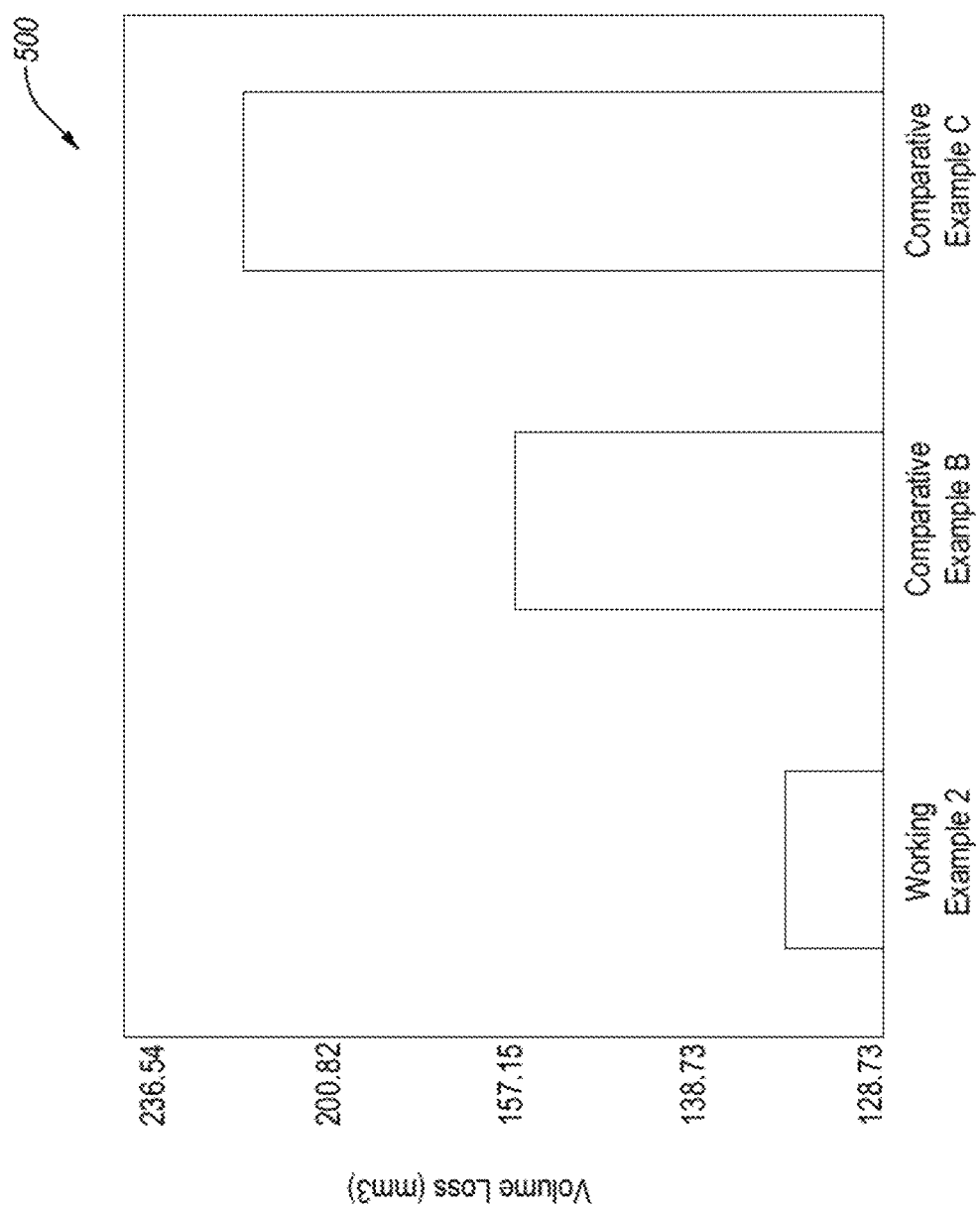
FIG. 5 is a graph of volume loss of wear tested substrates.

FIG. 5 is a graph 500 of volume loss of wear tested substrates. Working example 2 showed greater wear resistance relative to comparative examples B and C. As shown in FIG. 5, comparative example C lost about 218 mm$^3$, comparative example B lost about 157 mm$^3$, and working example 2 lost only 133 mm$^3$ of its total volume during the testing procedure.

The test results in FIGS. 4 and 5 demonstrated that lowering the cobalt content of the cemented carbide substrate to 12 wt % (working example 2) provides greater wear resistance compared to cemented carbide substrates with similar tungsten carbide grains, but with 13 wt % cobalt (comparative example B). The test results also demonstrated that lowering the tungsten carbide grains size in a substrate from 2.0-3.0 μm (comparative example B) to 1.2 μm (comparative example C), where the cementing constituent content is the same (13 wt %) in each sample, increases wear resistance of the substrate.

PDCs incorporating substrates of working example 2 and comparative example C were formed and tested for first crack propagation and wear resistance.

Comparative Example D

Comparative example D was formed by bonding the substrate of comparative example B to a diamond volume in an HPHT sintering process. The substrate of working example C was HPHT processed at a cell pressure of about 6 GPa and a temperature of about 1400° C. with a mass of diamond particles having an average particle size of about 29 μm.

Working Example 3

Working example 3 was formed by bonding a substrate of working example 2 to a diamond volume in an HPHT process. The substrate of working example 3 was sintered at a cell pressure of about 6 GPa and a temperature of about 1400° C. with a mass of diamond particles having an average particle size of about 29 μm.

The first crack load limit for the PDCs of working example 3 and comparative example D was evaluated by first crack testing. The first crack load limit of each PDC sample was evaluated using a load frame (MTS LANDMARK 500 kilo-newton servo-hydraulic load frame) by loading the working surface of the sample PDC against a testing surface of a tungsten carbide testing substrate, the working surface of the PDC having substantially the same diameter and shape as the testing surface of the testing substrate. The working surface of the PCD tables of the samples were loaded against a testing surface of the testing substrate along an axis of loading. The working surface of PCD table of the samples overlapped the testing surface (upper surface) of the testing substrate so as to define an area of overlap therebetween.

During first crack testing, the PDC overlapped the testing substrate by about 2.54 mm, measured from an outer radial periphery of the PDC and the testing substrate. The PDC sample was loaded against the testing substrate with a displacement of 0.01 in./min. (0.254 mm/min) until a first crack was detected (the first crack was detected by a reduction in load of at least 0.25% after the load exceeded 4,000 lbs.). As used herein, "first crack load" is a load of at least 4,000 lbs. immediately preceding an observed reduction of load of at least 0.25%. Samples were each interface sonoscanned prior to testing to screen out PDCs with initial damage, and the samples were each surface sonoscanned and/or dyed following first crack testing to confirm PDC failure.

Figure 6:
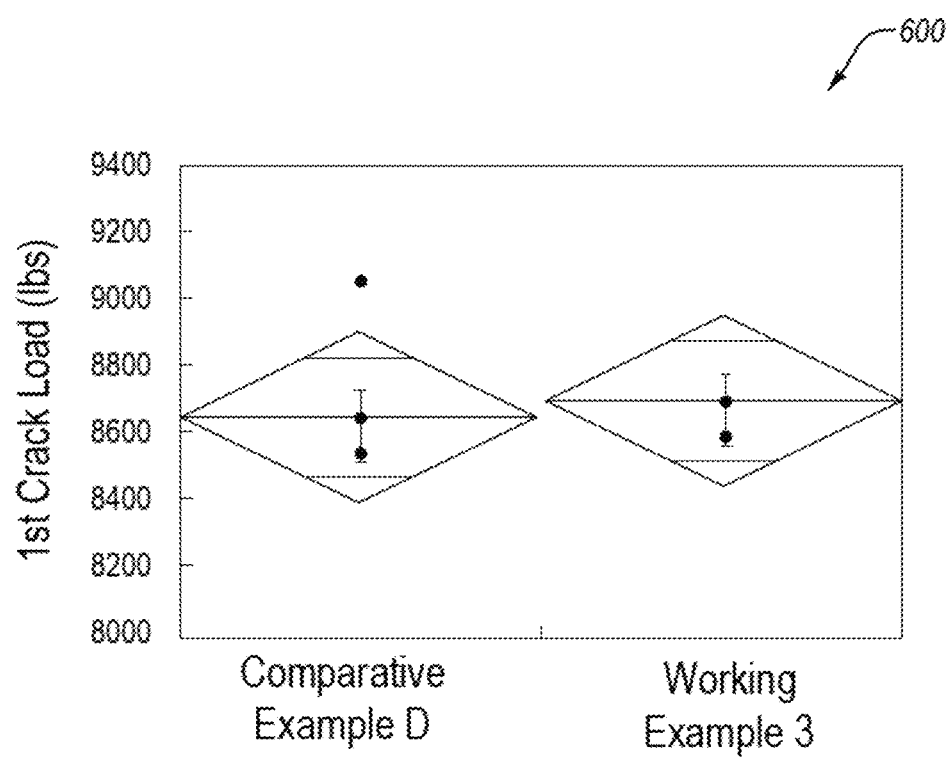
FIG. 6 is a graph of first crack propagation for working example 3 and comparative example D.

FIG. 6 is a graph 600 of first crack propagation in working example 3 and comparative example D. As shown the first crack in comparative example D appeared at an average load of about 8,650 lbf. (38,477 N) and the first crack in working example 3 appeared at an average load of about 8,700 lbf (38,700 N). The first crack propagation is believed to be indicative of the relative brittleness of a PDC or portions thereof such as the PCD or substrate. Accordingly, the substrate of working example 3 (substrate of working example 2 having 1.2 μm tungsten carbide grains and 12 wt % cobalt cementing constituent) may provide increased wear resistance over comparative example D (substrate of comparative example C including tungsten carbide grains having an average particle size of 1.2 μm and 13 wt % cobalt cementing constituent), without increasing the brittleness of the PDC or the PCD table thereof.

Working example 3 and comparative example D were tested for abrasion/wear resistance. The samples were tested for wear resistance in a vertical turret lathe test as described above with respect to the testing of comparative example A and working example 1 for the results shown FIG. 3. Each of the samples (comparative example D, and working example 3) were tested on the VTL and their volume was determined both prior to and after testing. The DVR was calculated for each sample by subtracting the post-test volume from the pre-test volume. The volume of granite removed was about 940 cubic inches ($1.51\times10^7$ mm$^3$) at 100 passes.

Figure 7A:
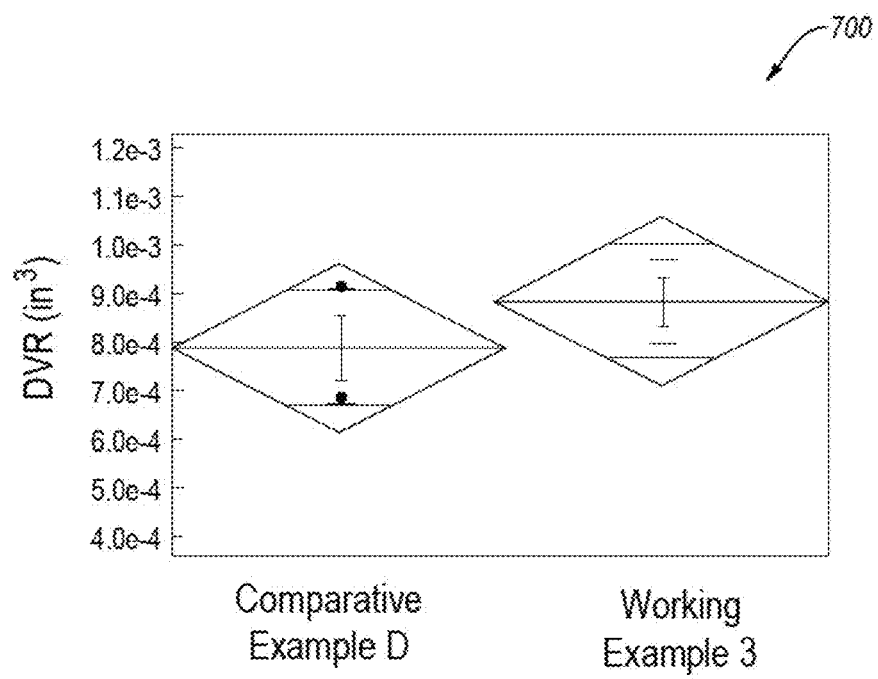
FIG. 7A is a graph of DVR for PDCs of working example 3 and comparative example D during a vertical turret lathe test.

FIG. 7A is a graph 700 of DVR of working example 3 and comparative example D during the VTL test. As shown, comparative example D had a diamond volume loss of about $8.0\times10^{-4}$ inch$^3$ (13.1 mm$^3$) and working example 3 had a diamond volume loss of about $9.0\times10^{-4}$ inch$^3$ (14.7 mm$^3$). As shown, the PCD table of the PDC of working example 3 had a similar wear resistance to the PCD table of comparative example D. Accordingly, the substrate of working example 3 (substrate of working example 2 having 1.2 μm tungsten carbide grains and 12 wt % cobalt cementing constituent) may have a greater wear resistance, first crack load, and corrosion resistance than the substrate of comparative example D (substrate of comparative example C including tungsten carbide grains having an average particle size of 1.2 μm and 13 wt % cobalt cementing constituent).

Working Example 4

Various substrates were formed and tested for corrosion resistance. Working example 4 included a cobalt-cemented tungsten carbide substrate with an average tungsten carbide grain size of about 3.0 μm. The substrate included about 10.5 wt % Cobalt and 2 wt % Nickel as the cobalt cementing constituent, with the balance being tungsten carbide grains.

Working example 4 was tested for corrosion resistance against comparative example C. A polarization cell was used to test working example 4 and comparative example C for corrosion resistance. The polarization cell included a 0.25 molar electrolyte solution (NaCl brine), a reference electrode, a counter electrode, and the samples to be tested (working example 4 and comparative example C) as the working electrode. The polarization cell was operated with direct current. A Gamry Potentiostat instrument (available from Gamry Instruments of Warminster, Pennsylvania, U.S.A.) was used to record the potential differences between the electrodes for the respective examples. Tafel plots were collected for each of working example 4 and comparative example C.

Figure 7B:
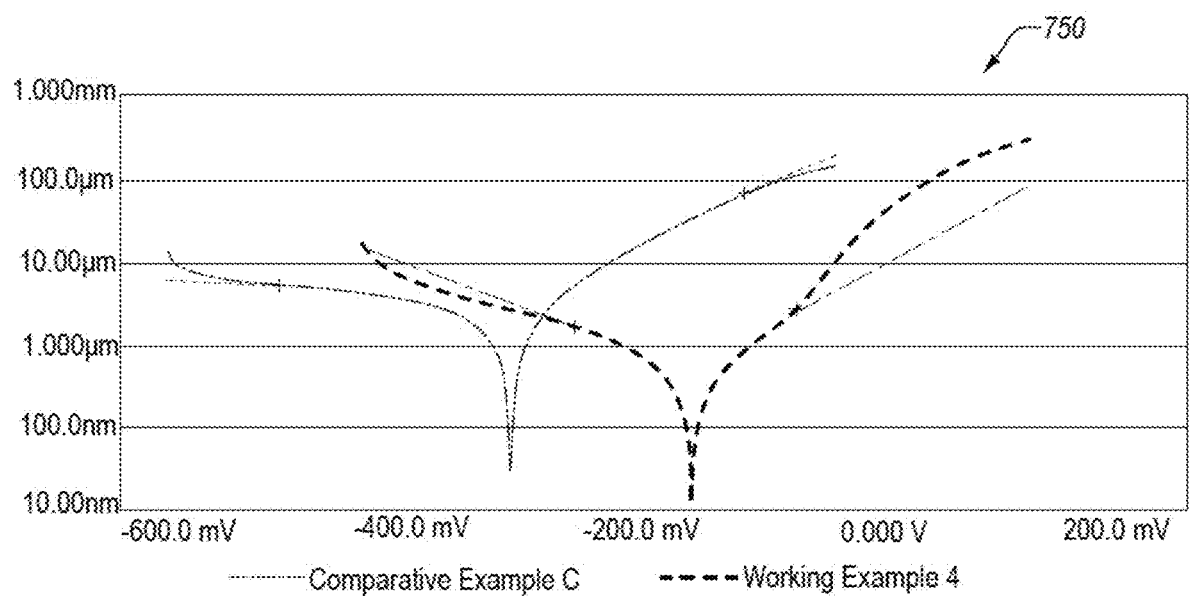
FIG. 7B is a graph of the Tafel plots of Working Example 4 and Comparative Example C.

FIG. 7B is a graph 750 of the Tafel plots of working example 4 and comparative example C. As shown, working example 4 exhibited an observed corrosion potential (e.g., current density minima) at less than −200 mV while comparative example C exhibited an observed corrosion potential at about −300 mV. The Tafel constants (e.g., slopes) from anodic and cathodic portions of the respective Tafel plots were used to calculate the corrosion rates of the respective samples. The corrosion rate of working example 4 was calculated to be 0.257 mil/year and the corrosion rate of comparative example C was calculated to be 1.842 mil/year Accordingly, the cementing constituent of working example 4, with 2 wt % Nickel and 10.5 wt % Cobalt, demonstrated far superior corrosion resistance to the cementing constituent of comparative example C which only contained cobalt.

Working example 4 and comparative example C were tested for various physical properties. The properties included density, fracture toughness, hardness, transverse rupture strength, coercivity, and corrosion rate. Working example 4 exhibited a hardness of 88.6 HRa, a fracture toughness of 13.19 MPa•m$^{1/2}$, a transverse rupture strength (TRS) of 481±37 ksi, and a density of 14.26 g/cc. Samples of comparative example C exhibited a hardness of 88.3-89.3 HRa, a fracture toughness of 11-13 MPa•m$^{1/2}$, and a TRS of 500±50 ksi.

Nine lots of working example 4 were formed and tested for various physical properties and compared to the physical properties of comparative example C. Table 1 below shows the properties of the sample substrates.

TABLE 1

| Lot No. | Hardness (HRa) | Coercivity (Oe) | Fracture Toughness (MPa · m$^{1/2}$) | Transverse Rupture Strength (ksi) | Density (g/cc) | Corrosion Rate (mil/year) |
|---|---|---|---|---|---|---|
| Comparative Example C | 88.3-89.3 | — | 11~13 | 500 +/− 50 | — | 5.84 |
| 1 | 88.6 | — | 13.19 | 481 +/− 37 | 14.26 | 3.61 |
| 2 | 88.8, 88.9 | 141 | — | — | 14.24 | — |
| 3 | 88.8, 88.9 | 145 | — | — | 14.36 | — |
| 4 | 88.4-88.6 | 138 | — | — | 14.28 | — |
| 5 | 88.4-88.6 | 140 | — | — | 14.29 | — |
| 6 | 88.5 | 139 | — | — | 14.28 | — |
| 7 | 88.7 | 140 | — | — | 14.30 | — |
| 8 | 88.55 | 133 | — | — | 14.27 | — |
| 9 | 88.5 | 133 | — | — | 14.27 | — |

The substrates of working example 4 had similar physical properties (fracture toughness, hardness, TRS) compared to the substrates of comparative example C, but exhibited a much lower corrosion rate. Accordingly, the 10.5 wt % cobalt/2 wt % nickel cementing constituent of working example 4 provides greater corrosion resistance than the pure cobalt cementing constituent of comparative example C, without sacrificing fracture toughness, hardness, TRS, or other physical properties.

Figure 8A:
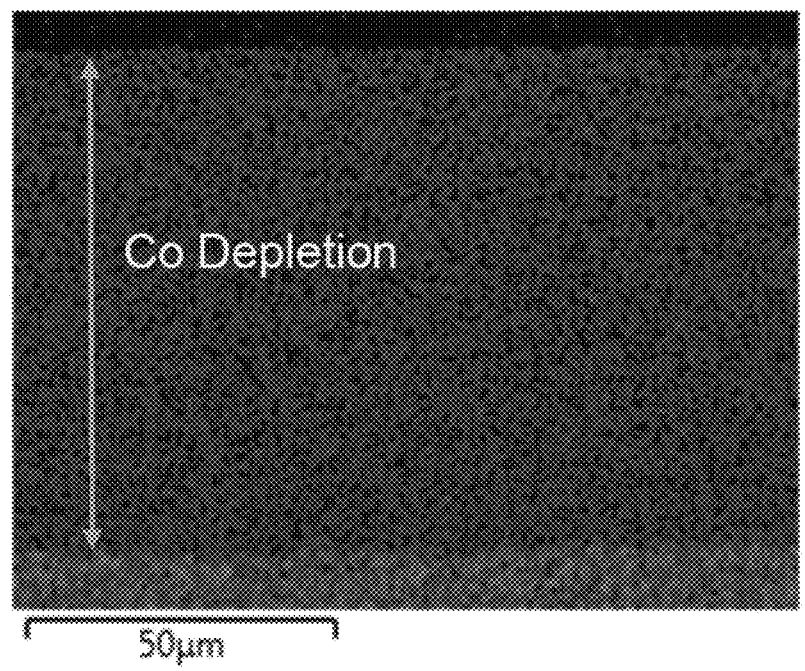
FIG. 8A is an image from a scanning electron microscope at 1000× magnification of the cut surface of comparative example C after corrosion testing.

Corroded test samples of working example 4 and comparative example C (as described above) were cut along the longitudinal axis and scanned with a scanning electron microscope at 1000× magnification and 5000× magnification at spectrum settings for cobalt, nickel, and tungsten. FIG. 8A is an image from a scanning electron microscope at 1000× magnification of the cut surface of comparative example C after corrosion testing. The depletion of the pure cobalt cementing constituent of comparative example C was approximately 75 μm deep.

Figure 8B:
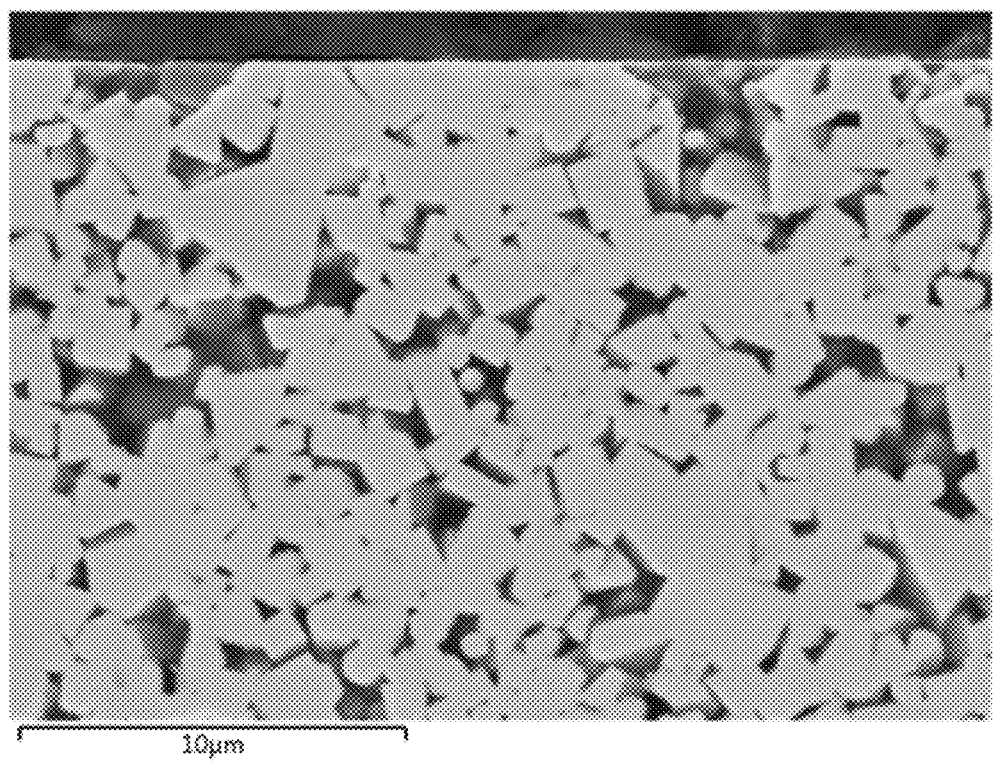
FIG. 8B is an image from a scanning electron microscope at 5000× magnification of the cut surface of comparative example C after corrosion testing.

FIG. 8B is an image from a scanning electron microscope at 5000× magnification of the cut surface of comparative example C after corrosion testing. The corroded area of comparative example C exhibited extensive and large vacancies between tungsten carbide grains (e.g., pitting), many of the vacancies being at least about 1 μm wide and some as large as about 4 μm wide.

Figure 9A:
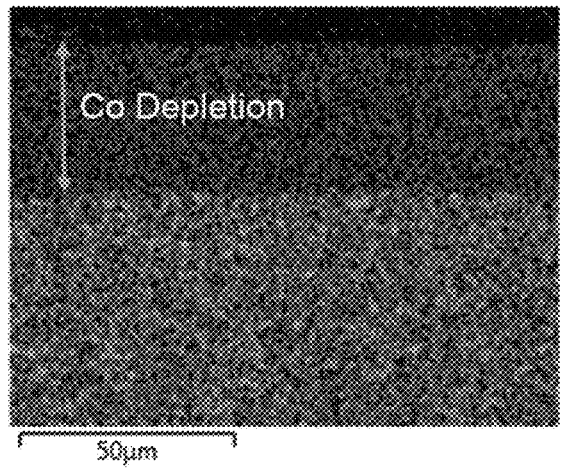
FIGS. 9A and 9B are images from a scanning electron microscope at 1000× magnification of the cut surface of working example 4 after corrosion testing.
Figure 9B:
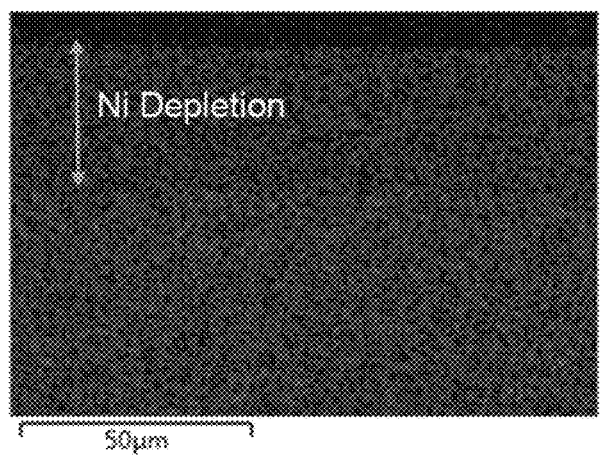

FIGS. 9A and 9B are images from a scanning electron microscope at 1000× magnification of the cut surface of working example 4 after corrosion testing. FIG. 9A depicts the depletion of cobalt in the substrate, and FIG. 9B depicts the depletion of nickel in the substrate. The depletion of the cobalt from the 10.5 wt % cobalt/2 wt % nickel cementing constituent of working example 4 was approximately 30 μm deep. The depletion of the nickel from the 10.5 wt % cobalt/2 wt % nickel cementing constituent of working example 4 was also approximately 30 μm deep.

Figure 9C:
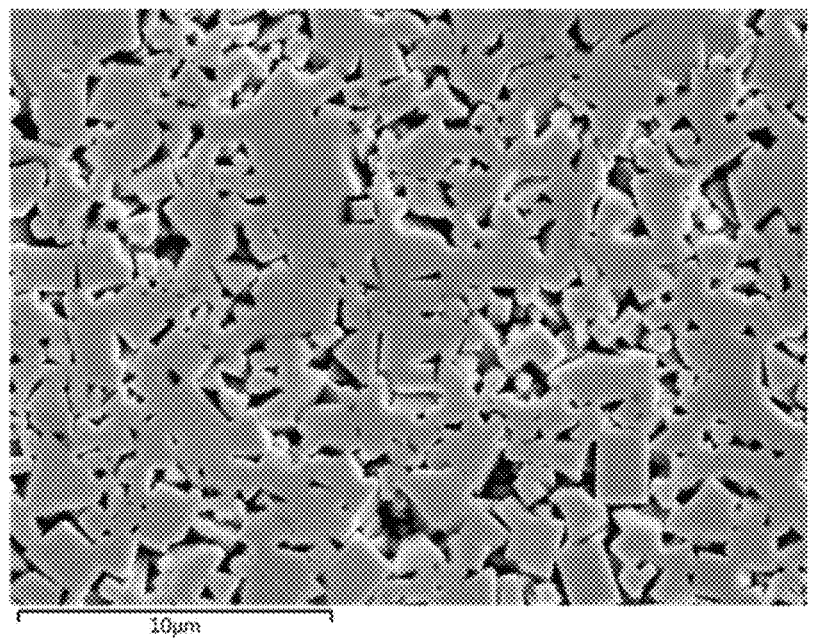
FIG. 9C is an image from a scanning electron microscope at 5000× magnification of the cut surface of working example 4 after corrosion testing.

FIG. 9C is an image from a scanning electron microscope at 5000× magnification of the cut surface of working example 4 after corrosion testing. The corroded area of working example 4 exhibited vacancies between tungsten carbide grains, the vacancies being less than about 3 μm wide and most being less than about 2 μm wide.

According to the scanning electron microscope images of FIGS. 8A, 9A, and 9B, the cementing constituent of comparative example C allowed more than twice the corrosion depth of the cementing constituent of working example 4 under the same corrosion conditions. Accordingly, the 10.5 wt % cobalt/2 wt % nickel content of working example 4 exhibited a higher corrosion resistance than the 13 wt % pure cobalt content of comparative example C.

According to the scanning electron microscope images of FIGS. 8B and 9C, the 10.5 wt % cobalt/2 wt % nickel content of working example 4 exhibited less extensive pitting (e.g., vacancies between tungsten carbide grains) than the 13 wt % pure cobalt content of comparative example C. Additionally, the pitting is smaller in working example 4 than in comparative example C.

Comparative Example E

Comparative example E included a PDC having a PCD table bonded to a substrate. A mixture of diamond powder having an average particle size of about 29 μm diamond particles was provided. The substrate was 13 wt % cobalt, with the remainder being tungsten carbide grains having an average particle size of about 1 μm. The diamond particle mixture and the substrate were placed in a refractory metal container and subjected to an HPHT sintering process. Comparative example E was sintered at a cell pressure of about 6.0 GPa and a temperature of about 1,950° C.

Working Example 5

Working example 5 included a PDC having a PCD table bonded to a substrate. The PCD table was formed from a diamond powder mixture having an average diamond particle size of about 29 μm. The substrate was 12 wt % cementing constituent including 2 wt % nickel and 10.5 wt % cobalt, with the remainder of the substrate being tungsten carbide grains having a particle size of about 1 μm. The diamond particle mixture and the substrate was placed in a refractory metal container and subjected to an HPHT sintering process. Working example 5 was sintered at a cell pressure of about 6.0 GPa and a temperature of about 1,950° C.

Figure 10:
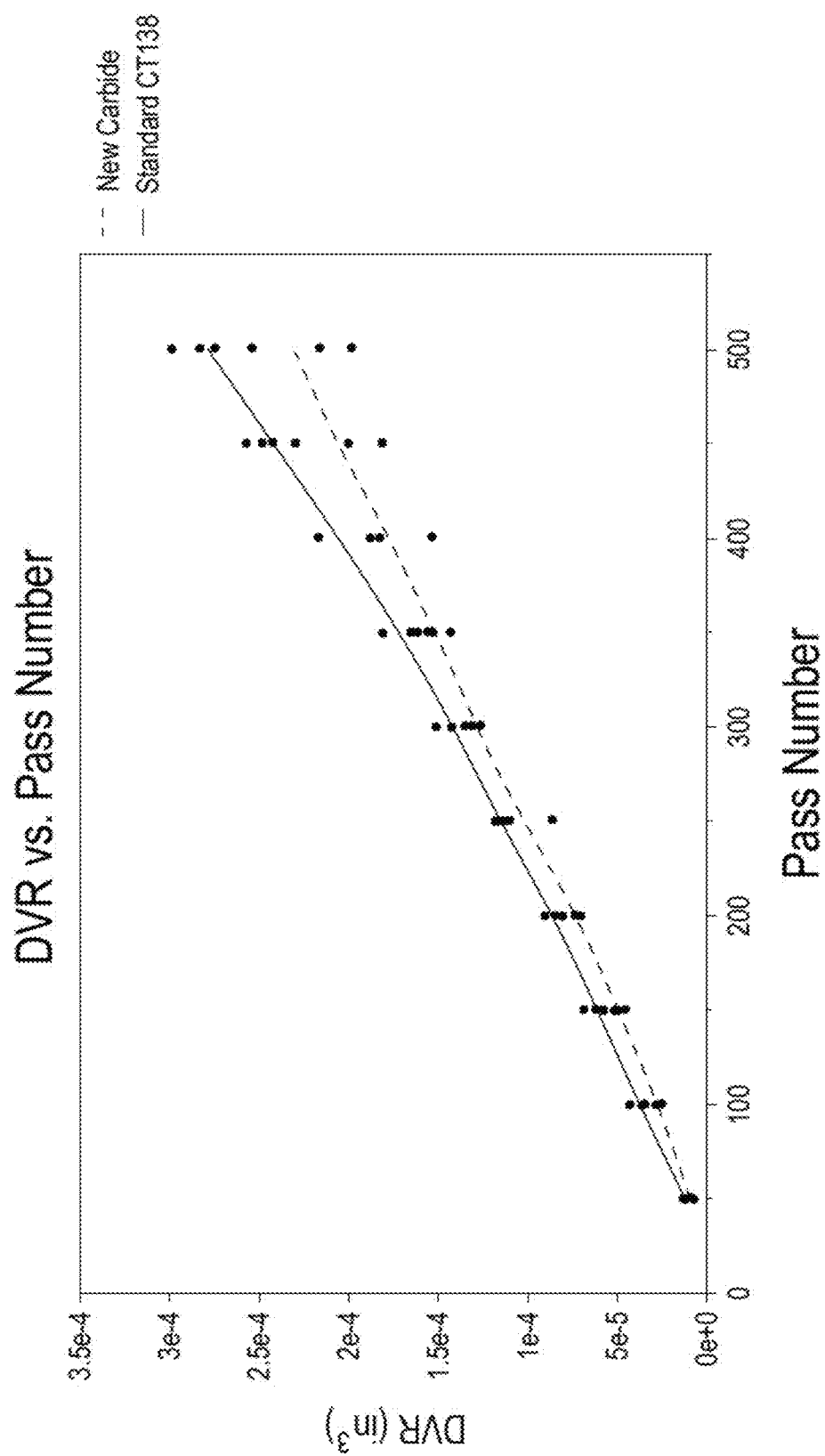
FIG. 10 is a graph of diamond volume removed per pass of working example 5 and comparative example E.

PDCs of working example 5 and comparative example E were leached for 504 hours in hydrofluoric acid and nitric acid to a depth of about 1200 microns from the upper surface of the polycrystalline diamond table. The leached examples (both working example and comparative example E) were tested for abrasion resistance via a VTL test under the same procedure disclosed above with respect to FIG. 3. FIG. 10 is a graph of diamond volume removed per pass of working example 5 and comparative example E. As shown, working example 5 exhibited less diamond volume removed than comparative example E during the VTL test. The rate of diamond volume loss for working example 5 was also lower than the rate of diamond volume loss for comparative example E as shown by the slope of the plots of the data points of the respective samples. Accordingly, PDCs made with substrates having 10.5 wt % cobalt and 2 wt % nickel provide greater abrasion resistance than PDCs made with a solely cobalt cementing constituent.

The inventor currently believes that a substrate having one or more of an average carbide grain size of less than 1.3 μm (e.g., less than 1.2 μm), a cobalt cementing constituent concentration of less than 12 wt % (e.g., less than 4 wt % nickel and less than 11 wt % cobalt), and a nickel content of greater than 0 wt % to 4 wt % in the cementing constituent, provides improved abrasion resistance, greater crack resistance, and/or corrosion resistance over standard cobalt cemented tungsten carbide substrates that do not have the combination of components of the substrates disclosed herein. For example, the inventor believes the substrates disclosed herein and PDCs including the same, in any of the combinations of components disclosed herein, provide the benefits of improvements to PDC abrasion resistance, substrate abrasion resistance, first crack load, and/or corrosion resistance.

The disclosed PDC embodiments may be used in a number of different applications including, but not limited to, use in a rotary drill bit (FIGS. 11A and 11B), a thrust-bearing apparatus, a radial bearing apparatus, a mining rotary drill bit (e.g., a roof bolt drill bit), and a wire-drawing die. The various applications discussed above are merely some examples of applications in which the PDC embodiments may be used. Other applications are contemplated, such as employing the disclosed PDC embodiments in friction stir welding tools.

Figure 11A:
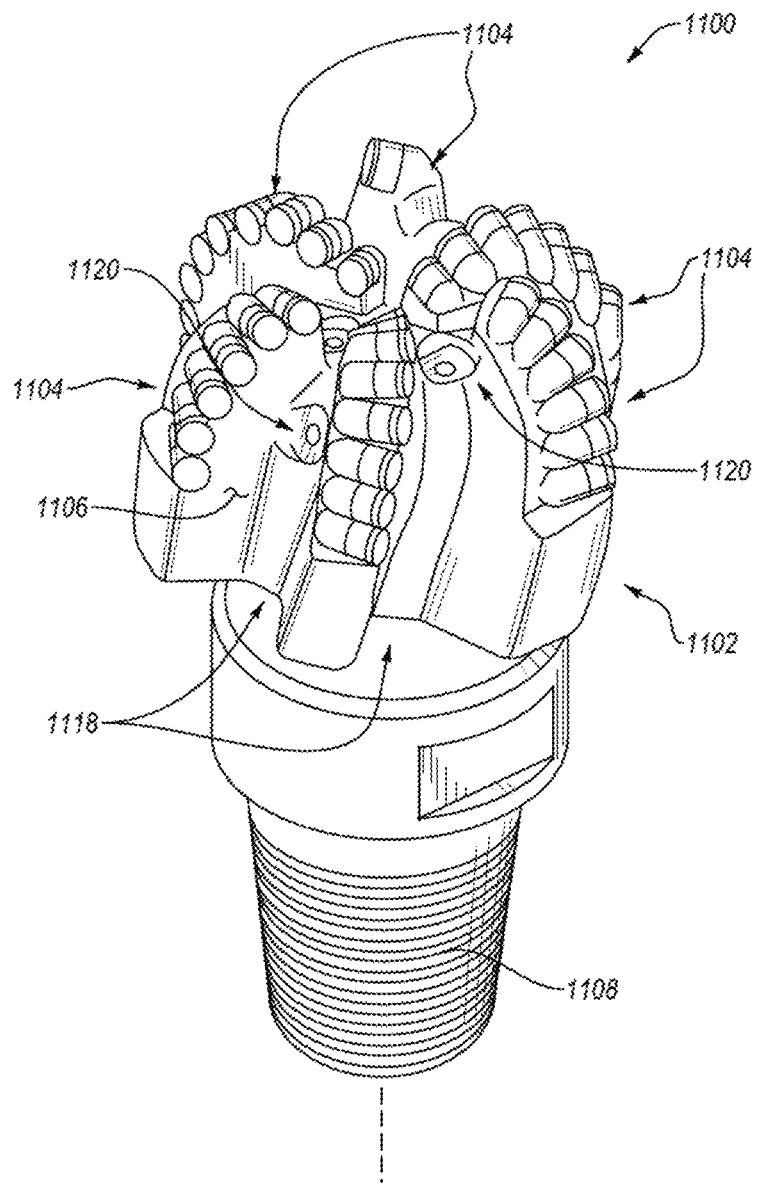
FIG. 11A is an isometric view of an embodiment of a rotary drill bit that may employ one or more of the disclosed PDC embodiments.
Figure 11B:
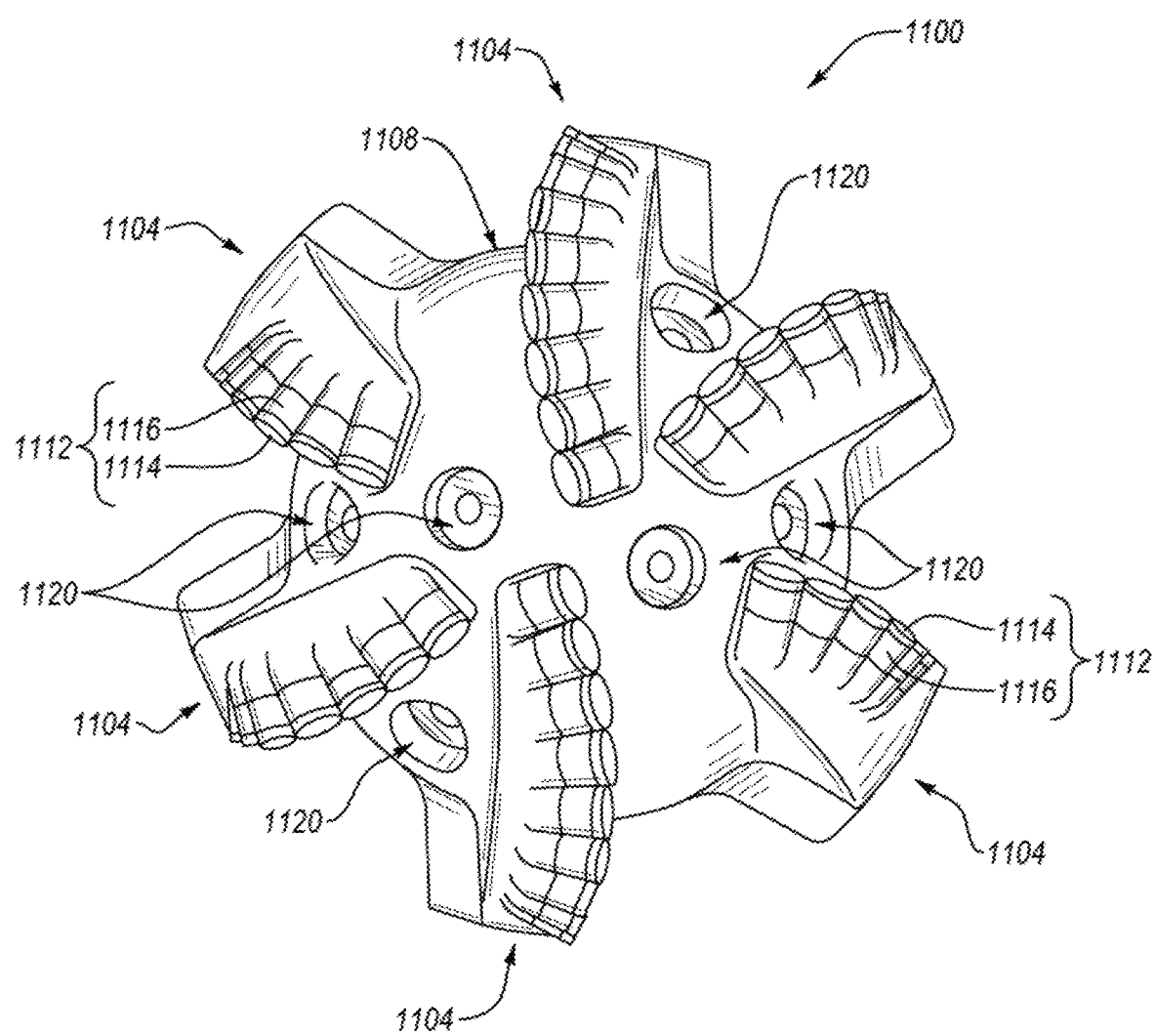
FIG. 11B is a top plan view of the rotary drill bit shown in FIG. 11A.

FIG. 11A is an isometric view and FIG. 11B is a top plan view of an embodiment of a rotary drill bit 1100 for use in subterranean drilling applications, such as oil and gas exploration. The rotary drill bit 1100 includes at least one PCD element and/or PDC configured according to any of the previously described PDC embodiments. The rotary drill bit 1100 comprises a bit body 1102 that includes radially and longitudinally extending blades 1104 with leading faces 1106, and a threaded pin connection 1108 for connecting the bit body 1102 to a drilling string. The bit body 1102 defines a leading end structure for engaging (e.g., drilling into) a subterranean formation by rotation about a longitudinal axis and application of weight-on-bit. At least one PDC cutting element, configured according to any of the previously described PDC embodiments (e.g., PDC 100) may be affixed to the bit body 1102. For example at least one of the PDCs 1112 may include a substrate 1116 having a first plurality of carbide grains (e.g., tungsten carbide grains with an average particle size of about 1.2 µm or less) and a cementing constituent that is less than 13 wt % (e.g., less than 12 wt %) of the substrate. The cementing constituent may include a cobalt alloy having cobalt in an amount below 12 wt % of the substrate and at least one alloying element, where each component and the total of all components is less than 12 wt % of the substrate (e.g., less than 6 wt % cobalt and less than 6 wt % nickel or less than 4 wt % nickel and less than 9 wt % cobalt). The substrate 1116 is bonded to a PCD table 1114.

With reference to FIG. 11B, a plurality of PDCs 1112 are secured to the blades 1104. For example, each PDC 1112 may include a PCD table 1114 bonded to a substrate 1116. More generally, the PDCs 1112 may comprise any PDC disclosed herein, without limitation. In addition, if desired, in some embodiments, a number of the PDCs 1112 may be conventional in construction. Also, circumferentially adjacent blades 1104 define so-called junk slots 1118 therebetween, as known in the art. Additionally, the rotary drill bit 1100 may include a plurality of nozzle cavities 1120 for communicating drilling fluid from the interior of the rotary drill bit 1100 to the PDCs 1112.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A polycrystalline diamond compact, comprising:
  a substrate including:
    a first plurality of carbide grains;
    a second plurality of carbide grains including at least vanadium carbide constituting less than 0.5 weight percent (wt %) of the substrate;
    a cementing constituent constituting less than 13 wt % of the substrate, the cementing constituent including a cobalt alloy having cobalt and at least one alloying element;
    wherein the at least one alloying element constitutes less than 12 wt % of the substrate;
    wherein the cobalt constitutes less than 12 wt % of the substrate; and
  a polycrystalline diamond table bonded to the substrate;
  wherein the substrate includes a fracture toughness of 12.0 MPa•m$^{1/2}$ to 14.0 MPa•m$^{1/2}$.

2. The polycrystalline diamond compact of claim 1, wherein the at least one alloying element includes at least one Group IB element, at least one Group IIB element, at least one Group IIIB element, at least one Group IVB element, at least one Group VB element, at least one Group VIB element, at least one Group VIIB element, at least one Group VIIIB element, or combinations of the foregoing.

3. The polycrystalline diamond compact of claim 1, wherein the at least one alloying element includes nickel and wherein the first plurality of carbide grains includes tungsten carbide grains.

4. The polycrystalline diamond compact of claim 1, wherein the at least one alloying element includes nickel in an amount that is at least 2 wt % of the substrate.

5. The polycrystalline diamond compact of claim 1, wherein the at least one alloying element includes nickel in an amount that is less than 6 wt % of the substrate.

6. The polycrystalline diamond compact of claim 1, wherein the at least one alloying element includes nickel in an amount that is less than 6 wt % of the substrate and the cobalt is present in an amount that is less than 6 wt % of the substrate.

7. The polycrystalline diamond compact of claim 1, wherein the second plurality of carbide grains is a different type of carbide than the first plurality of carbide grains.

8. The polycrystalline diamond compact of claim 7, wherein:
  the substrate includes at least one additive including one or more of rhenium or ruthenium; and
  the rhenium is less than 0.5 wt % of the substrate or the ruthenium is less than 3 wt % of the substrate.

9. The polycrystalline diamond compact of claim 8, wherein the at least one additive is not alloyed with cobalt alloy.

10. The polycrystalline diamond compact of claim 1, wherein the second plurality of carbide grains includes the at least vanadium carbide constituting about 0.15 wt % to less than 0.5 wt % of the substrate.

11. The polycrystalline diamond compact of claim 1, wherein carbide grains of the first plurality of carbide grains and the second plurality of carbide grains are bonded together with the cementing constituent, the carbide grains of the first plurality of carbide grains and the second plurality of carbide grains exhibiting an average particle size of about 0.5 µm to about 1.5 µm.

12. The polycrystalline diamond compact of claim 1, wherein the at least one alloying element includes at least an interstitial alloying element including at least one Group IIIA element, at least one Group IVA element, at least one group VA element, at least one Group VIA Element.

13. The polycrystalline diamond compact of claim 1, wherein the substrate includes one or more of a density of about 14.0 g/cc to about 15.0 g/cc, a hardness of about 88.0

HRa to about 89.0 HRa, a transverse rupture strength of about 400 ksi to about 550 ksi, or a corrosion rate of about 0.1 mil/year to about 4.0 mil/year.

14. A method of forming a polycrystalline diamond compact, the method comprising:
   providing a substrate, the substrate including:
      a first plurality of carbide grains;
      a second plurality of carbide grains including at least vanadium carbide constituting less than 0.5 weight percent (wt %) of the substrate; and
      a cementing constituent constituting less than 13 weight percent (wt %) of the substrate, the cementing constituent including a cobalt alloy having cobalt and at least one alloying element;
      wherein the at least one alloying element constitutes less than 12 wt % of the substrate;
      wherein the cobalt constitutes less than 12 wt % of the substrate;
   disposing a volume of diamond particles adjacent to the substrate to form an assembly; and
   subjecting the assembly to a high-pressure high-temperature process to sinter the diamond particles to form a polycrystalline diamond table and to bond the substrate to the polycrystalline diamond table;
   wherein the substrate includes a fracture toughness of 12.0 MPa·m$^{1/2}$ to a 14.0 MPa·m$^{1/2}$.

15. The method of claim 14, wherein the at least one alloying element includes nickel in an amount that is at least 2 wt % of the substrate.

16. The method of claim 14, wherein the at least one alloying element includes nickel in an amount that is less than 6 wt % of the substrate and the cobalt is present in an amount that is less than 6 wt % of the substrate.

17. The method of claim 14, wherein the second plurality of carbide grains includes the at least vanadium carbide constituting about 0.15 wt % to less than 0.5 wt % of the substrate.

18. The method of claim 17, wherein:
   the substrate includes at least one additive including one or more of rhenium or ruthenium; and
   the rhenium is less than 0.5 wt % of the substrate or the ruthenium is less than 3 wt % of the substrate.

19. A rotary drill bit, comprising:
   a bit body configured to engage a subterranean formation; and
   a plurality of polycrystalline diamond cutting elements affixed to the bit body, at least one of the polycrystalline diamond cutting elements including:
      a substrate including:
         a first plurality of carbide grains;
         a second plurality of carbide grains including at least vanadium carbide constituting less than 0.5 weight percent (wt %) of the substrate; and
         a cementing constituent constituting less than 13 weight percent (wt %) of the substrate, the cementing constituent including a cobalt alloy having cobalt and at least one alloying element;
         wherein the at least one alloying element constitutes less than 12 wt % of the substrate;
         wherein the cobalt constitutes less than 12 wt % of the substrate; and
      a polycrystalline diamond body bonded to the substrate;
      wherein the substrate includes a fracture toughness of 12.0 MPa·m$^{1/2}$ to 14.0 MPa·m$^{1/2}$.

20. The rotary drill bit of claim 19, wherein the at least one substitutional alloying element includes nickel in an amount that is less than 6 wt % of the substrate and the cobalt is present in an amount that is less than 6 wt % of the substrate.

21. The rotary drill bit of claim 19, wherein the at least one alloying element includes nickel in an amount that is at least 2 wt % of the substrate.

22. The rotary drill bit of claim 19, wherein the at least one alloying element includes nickel in an amount that is less than 6 wt % of the substrate and the cobalt is present in an amount that is less than 6 wt % of the substrate.

23. The rotary drill bit of claim 19, wherein the second plurality of carbide grains is a different type of carbide than the first plurality of carbide grains.

24. The rotary drill bit of claim 23, wherein the second plurality of carbide grains includes the at least vanadium carbide constituting about 0.15 wt % to less than 0.5 wt % of the substrate.

25. The rotary drill bit of claim 19, wherein:
   the substrate includes at least one additive including one or more of rhenium or ruthenium; and
   the rhenium is less than 0.5 wt % of the substrate or the ruthenium is less than 3 wt % of the substrate.

* * * * *